United States Patent
Nagaishi et al.

(10) Patent No.: US 8,224,103 B2
(45) Date of Patent: Jul. 17, 2012

(54) IMAGE ENCODING METHOD AND DEVICE, IMAGE DECODING METHOD AND DEVICE, AND IMAGING DEVICE

(75) Inventors: Yuji Nagaishi, Osaka (JP); Kazuo Okamoto, Osaka (JP); Tatsuro Juri, Osaka (JP)

(73) Assignee: Panasonic Corporation, Osaka (JP)

( * ) Notice: Subject to any disclaimer, the term of this patent is extended or adjusted under 35 U.S.C. 154(b) by 1074 days.

(21) Appl. No.: 12/089,532

(22) PCT Filed: Sep. 28, 2006

(86) PCT No.: PCT/JP2006/319326
§ 371 (c)(1),
(2), (4) Date: Apr. 7, 2008

(87) PCT Pub. No.: WO2007/043351
PCT Pub. Date: Apr. 19, 2007

(65) Prior Publication Data
US 2009/0244307 A1   Oct. 1, 2009

(30) Foreign Application Priority Data

Oct. 7, 2005   (JP) ................................. 2005-294470

(51) Int. Cl.
*G06K 9/36*   (2006.01)
(52) U.S. Cl. ...................................................... 382/232
(58) Field of Classification Search .......... 382/232–233, 382/236–237, 240, 251, 275; 348/394.1, 348/400.1–401.1, 409.1–412.1, 425.2; 375/240.03, 375/240.12, 240.22, 240.23
See application file for complete search history.

(56) References Cited

U.S. PATENT DOCUMENTS

| | | | | |
|---|---|---|---|---|
| 5,416,857 A | * | 5/1995 | Chen et al. .................... | 382/237 |
| 6,272,259 B1 | | 8/2001 | Mizoguchi | |
| 6,744,929 B1 | | 6/2004 | Okada | |
| 2002/0039143 A1 | | 4/2002 | Sasaki | |

FOREIGN PATENT DOCUMENTS

| | | |
|---|---|---|
| JP | 6-153087 | 5/1994 |
| JP | 11-103413 | 4/1999 |
| JP | 11-341288 | 12/1999 |
| JP | 2000-244935 | 9/2000 |
| JP | 2002-111989 | 4/2002 |

(Continued)

OTHER PUBLICATIONS

International Preliminary Report on Patentability issued Apr. 17, 2008 in the International (PCT) Application No. PCT/JP2006/319326.

(Continued)

*Primary Examiner* — Jose Couso
(74) *Attorney, Agent, or Firm* — Wenderoth, Lind & Ponack, L.L.P.

(57) ABSTRACT

An image encoding method is for obtaining, from a pixel data string containing pixel values of a plurality of pixels in a pixel array where the pixels are arrayed, a pixel data string containing a quantized representative value into which at least one of the pixel values is encoded. Encoding is performed by allocating a specific quantized representative value when a pixel value of a pixel is a specific pixel value, and by allocating a quantized representative value other than the specific quantized representative value when the pixel value is other than the specific pixel value.

11 Claims, 22 Drawing Sheets

FOREIGN PATENT DOCUMENTS

| | | |
|---|---|---|
| JP | 2005-236749 | 9/2005 |
| WO | 00/30022 | 5/2000 |

OTHER PUBLICATIONS

A Chinese Office Action (with English translation) issued Mar. 27, 2009 in Chinese Application No. 200680037288.3, which is a foreign counterpart of the present application.

Li Hongsong and Quang Ziyi "A New Still-Picture Compression Coding Algorithm" (with English Abstract), Journal of Electronics, published Nov. 1995, vol. 17, No. 6, pp. 561-568.

International Search Report issued Jan. 16, 2007 in the International (PCT) Application No. PCT/JP2006/319326.

Extended European Search Report issued Apr. 16, 2012 in European Patent Application No. 06 81 0773.

\* cited by examiner

IMAGE ENCODING METHOD AND DEVICE, IMAGE DECODING METHOD AND DEVICE, AND IMAGING DEVICE

BACKGROUND

1. Field of the Invention

The present invention relates to an image encoding method and an image encoding device using the image encoding method, and more particularly, to an image encoding method and an image encoding device for compressing an image using an imaging sensor of a video camera, a digital still camera, or the like.

2. Description of the Related Art

In recent years, in camera devices that include an imaging sensor, such as a digital still camera, a mobile phone with a camera, and a movie camera, an increase in the number of pixels has been advanced. On the other hand, a reduction in the amount of memory buffer and a reduction in power consumption are desired. In view of this, a method for reducing raw data (pixel data from an imaging sensor itself) from a sensor which consumes a memory buffer is considered. In this case, when performing irreversible compression, handling of defective pixel information of a sensor is a problem.

When image data including information indicative of a defective pixel is irreversibly compressed, there is a possibility that the information indicative of a defective pixel may be lost. Therefore, it is desirable to correct a defective pixel before compression but in view of memory and circuit costs incurred for a correction process, there is a desire to make good use in a sharing manner of external memory and circuit present in a subsequent-stage circuit for signal processing. This, in turn, results in that compression cannot be performed at a preceding stage for signal processing, causing a problem that it is difficult to reduce the amount of memory buffer and power consumption.

Also, there is a technique for referring to a code value obtained from a difference in pixel value between adjacent pixels, by a table value, as shown in Japanese Patent Laid-Open Publication No. 11-341288. Furthermore, there is a technique for encoding pixel information of the same color in DPCM encoding compression, as shown in Japanese Patent Laid-Open Publication No. 2000-244935.

SUMMARY OF THE INVENTION

An object of the present invention is to provide image encoding method and device in which even when pixel data from an imaging sensor includes correction portion defective pixel data, by processing the data by adaptive and reversible compression, the data can be encoded such that the defective pixel data can be properly corrected in a process at a subsequent stage.

An image encoding method according to the present invention is the image encoding method for obtaining, from a pixel data string containing pixel values of a plurality of pixels in a pixel array where the pixels are arrayed, a pixel data string containing a quantized representative value into which at least one of the pixel values is encoded, the method includes:

performing encoding by allocating a specific quantized representative value when a pixel value of a pixel is a specific pixel value, and by allocating a quantized representative value other than the specific quantized representative value when the pixel value is other than the specific pixel value.

The pixels each have an m-bit pixel value and the encoded quantized representative value is n bits smaller than m bits, and prior to the encoding, a predetermined offset value may be added to a pixel value of each pixel whose pixel value is not the specific pixel value.

Note that the offset value may be $2^{(m-n)}-1$.

An image encoding method according to the present invention is the image encoding method for obtaining, from a pixel data string containing m-bit pixel values of a plurality of pixels in a pixel array where the pixels are arrayed, a pixel data string containing n-bit quantized representative values into which difference values between the pixel values are encoded, the method includes:

calculating a difference value between a pixel value of a first pixel and a pixel value of a second pixel adjacent to the first pixel;

representing the difference value by a k-bit quantized representative value according to the difference value; and converting the k-bit quantized representative value of the difference value into one of the n-bit quantized representative values to encode the k-bit quantized representative value, wherein when the pixel value of the second pixel is a specific pixel value, as the difference value, the value is converted into a specific quantized representative value.

The image encoding method may further include the step of calculating a quantized width by comparing the k-bit quantized representative value with the n-bit quantized representative value, the quantized width representing a degree of compression of the difference value that has gone through the conversion.

When the pixel value of the second pixel is the specific pixel value, a specific quantized representative value with a predetermined quantized width may be allocated as the difference value.

In the step of representing the difference value by a k-bit quantized representative value, when the pixel value of the second pixel is not the specific pixel value and the k-bit quantized representative value to be allocated is the specific quantized representative value, the difference value may be represented by allocating one of quantized representative values with a (k+1)-bit quantized width instead of a k-bit quantized width.

In the step of converting the k-bit quantized representative value of the difference value into the n-bit quantized representative value, when the pixel value of the second pixel is not the specific pixel value and the k-bit quantized representative value of the difference value is the specific quantized representative value, the value may be converted into one of quantized representative values other than the specific quantized representative value of n bits.

In the step of converting the k-bit quantized representative value of the difference value into the n-bit quantized representative value, when the pixel value of the second pixel is not the specific pixel value and the n-bit quantized representative value to be converted is the specific quantized representative value, the value may be converted into one of quantized representative values other than the specific quantized representative value of n bits.

Preferably, the pixel value of the first pixel is encoded by allocating any pixel value other than the specific pixel value.

The pixel array has pixels of at least two types of colors arrayed therein, and in the step of calculating the difference value, a difference value between a pixel value of a first pixel and a pixel value of a second pixel may be calculated, when the second has the same color as the first pixel and the second pixel is located adjacent to the first pixel.

The pixel array has pixels of at least two types of colors arrayed therein, and in the step of calculating the difference value, a difference value between a pixel value of a first pixel and a pixel value of a second pixel may be calculated, when the second pixel has a different color other than the first pixel and the second pixel is located adjacent to the first pixel.

The image encoding method may further include the step of packing the pixel data string containing the encoded quantized representative value, by multiples of a memory access bit width.

Note that the specific pixel value may be 0.

An image encoding device according to the present invention is the image encoding device for obtaining, from a pixel data string containing pixel values of a plurality of pixels in a pixel array where the pixels are arrayed, a pixel data string containing a quantized representative value into which at least one of the pixel values is encoded, the device includes:

a specific pixel value determining unit that determines whether the pixel values of the pixels are a specific pixel value; and an encoding unit that performs encoding by allocating a specific quantized representative value when a pixel value of a pixel is the specific pixel value, and by allocating a quantized representative value other than the specific quantized representative value when the pixel value of the pixel is other than the specific pixel value.

An image encoding device according to the present invention is the image encoding device for obtaining, from a pixel data string containing m-bit pixel values of a plurality of pixels in a pixel array where the pixels are arrayed, a pixel data string containing n-bit quantized representative values into which difference values between the pixel values are encoded, the device includes:

a difference value calculating unit that calculates a difference value between a pixel value of a first pixel and a pixel value of a second pixel adjacent to the first pixel;

an intermediate quantizing unit that represents the difference value by a k-bit quantized representative value according to the difference value;

a specific pixel value determining unit that determines whether the pixel value of the second pixel is a specific pixel value; and an encoding unit that performs encoding by converting the k-bit quantized representative value of the difference value into one of the n-bit quantized representative values when the pixel value of the second pixel is the specific pixel value, and by converting the k-bit quantized representative value of the difference value into one of quantized representative values other than the specific quantized representative value of n bits when the pixel value of the second pixel is other than the specific pixel value.

When the pixel value of the second pixel is not the specific pixel value and the k-bit quantized representative value is the specific quantized representative value, the intermediate quantizing unit may encode the difference value by allocating one of quantized representative values with a (k+1)-bit quantized width instead of a k-bit quantized width.

When the pixel value of the second pixel is not the specific pixel value and the k-bit quantized representative value of the difference value is the specific quantized representative value, the encoding unit may convert the value into one of quantized representative values other than the specific quantized representative value of n bits.

Furthermore, when the pixel value of the second pixel is not the specific pixel value and the n-bit quantized representative value to be converted is the specific quantized representative value, the encoding unit may convert the value into one of quantized representative values other than the specific quantized representative value of n bits.

The difference value calculating unit may calculate a difference value between the pixel value of the first pixel and a pixel value of a second pixel, when the second pixel has the same color as the first pixel, and the second pixel is located adjacent to the first pixel.

The difference value calculating unit may calculate a difference value between the pixel value of the first pixel and a pixel value of a second pixel, when the second pixel has a different color other than the color of the first pixel, the second pixel is located adjacent to the first pixel.

Moreover, the image encoding device may further include:

a quantized width calculating unit that calculates a quantized width by comparing the k-bit quantized representative value with the n-bit quantized representative value, the quantized width representing a degree of compression of the difference value that has gone through the conversion; and a packing unit that packs, for the difference value, an image data string containing the converted n-bit quantized representative value and the quantized width in a predetermined unit.

An image decoding method according to the present invention is the image decoding method for obtaining, from a pixel data string containing a quantized representative value into which at least one pixel value is encoded, a pixel data string containing a decoded pixel value, the method includes:

performing decoding by allocating a specific pixel value when the quantized representative value of the pixel that has been encoded is a specific quantized representative value, and by allocating a pixel value other than the specific pixel value when the quantized representative value of the pixel that has been encoded is other than the specific quantized representative value.

An image decoding method according to the present invention is the image decoding method for obtaining, from a pixel data string containing an n-bit quantized representative value into which a difference value between pixels is encoded, a pixel data string containing a decoded m-bit pixel value, the method includes:

depacking a pixel data string that has been encoded;

obtaining a first coded value as a pixel value of a first pixel;

obtaining a second coded value as an encoded quantized representative value of a difference value between the pixel value of the first pixel and a pixel value of a second pixel;

determining whether the second coded value is a specific quantized representative value;

obtaining the difference value between the pixel value of the first pixel and the pixel value of the second pixel by decoding the second coded value; and obtaining the pixel value of the second pixel by adding the difference value that has been decoded to the pixel value of the first pixel that has been decoded, wherein when the second coded value is the specific quantized representative value, a specific pixel value is decoded by allocating as the pixel value of the second pixel.

The image decoding method may further include the step of obtaining a quantized width representing a degree of compression of the difference value that has been encoded, wherein in the step of obtaining the difference value by decoding the second coded value, the difference value may be obtained by decoding the second coded value according to the quantized width.

An image decoding device according to the present invention is the image decoding device for obtaining, from a pixel data string containing a quantized representative value into which at least one pixel value is encoded, a pixel data string containing a decoded pixel value, the device includes:

a specific pixel value determining unit that determines whether the quantized representative value is a specific quantized representative value; and a decoding unit that performs decoding by allocating a specific pixel value when the quantized representative value is the specific quantized representative value, and by allocating a pixel value other than the specific pixel value when the quantized representative value is other than the specific quantized representative value.

An image decoding device according to the present invention is the image decoding device for obtaining, from a pixel data string containing an n-bit quantized representative value into which a difference value between pixels is encoded, a pixel data string containing a decoded m-bit pixel value, the device includes:

a depacking unit that depacks a pixel data string that has been encoded;

a coded value extracting unit that obtains a first coded value as a pixel value of a first pixel and obtains a second coded value as an encoded quantized representative value of a difference value between the pixel value of the first pixel and a pixel value of a second pixel;

a specific pixel value determining unit that determines whether the second coded value is a specific quantized representative value; and a decoding unit that decodes by allocating a specific pixel value as the pixel value of the second pixel when the second coded value is the specific quantized representative value; and obtains the difference value by decoding the second coded value and obtains the pixel value of the second pixel by adding the difference value to the pixel value of the first pixel that has been decoded, when the second coded value is not the specific quantized representative value.

An imaging device according to the present invention includes:

an imaging sensor that outputs m-bit pixel data by performing analog-digital conversion; and the image encoding device.

The image decoding device may further include a quantized width extracting unit that obtains a quantized width representing a degree of compression of the difference value that has been encoded, wherein the decoding unit can obtain the difference value by decoding the second coded value according to the quantized width.

According to the image encoding method according to the present invention, when pixel data is compressed and encoded, defective pixel data can be indicated by one quantized representative value representing a coded value, and thus, there is no need for information on a defective pixel to separately occupy a memory. In addition, upon decoding, when an encoded quantized representative value is a specific quantized representative value, it reveals that its original pixel value is defective pixel data, and thus, reversible encoding/decoding can be performed on the defective pixel data.

BRIEF DESCRIPTION OF THE DRAWINGS

The present invention will become readily understood from the following description of preferred embodiments thereof made with reference to the accompanying drawings, in which like parts are designated by like reference numeral and in which.

DESCRIPTION OF THE REFERENCE NUMERALS

Figure 1:
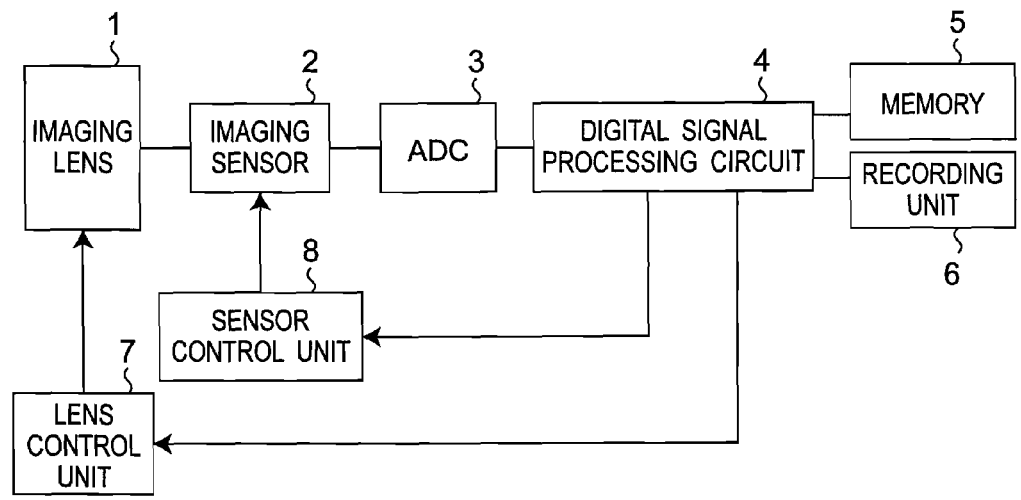
FIG. 1 is a block diagram showing the configuration of a digital still camera according to a first embodiment of the present invention.

1: IMAGING LENS; 2: IMAGING SENSOR; 3: ADC, 4: DIGITAL SIGNAL PROCESSING CIRCUIT; 5: MEMORY; 6: RECORDING UNIT; 7: LENS CONTROL UNIT; 8: SENSOR CONTROL UNIT; 10, 10a, and 10b: IMAGE ENCODING DEVICE (COMPRESSING UNIT); 10c: IMAGE ENCODING CIRCUIT; 11: PRE-PROCESSING UNIT; 12: SIGNAL PROCESSING UNIT; 13: JPEG PROCESSING UNIT; 14: DISPLAY PROCESSING UNIT; 15: IF PROCESSING UNIT; 20 and 20a: IMAGE DECODING DEVICE (DECOMPRESSING UNIT); 21: PIXEL INPUT UNIT; 22: SPECIFIC PIXEL VALUE DETERMINING UNIT; 23: ENCODING UNIT; 24: PACKING UNIT; 25: DIFFERENCE VALUE CALCULATING UNIT; 26: INTERMEDIATE QUANTIZING UNIT; 27: QUANTIZED WIDTH CALCULATING UNIT; 31: DEPACKING UNIT; 32: CODE VALUE EXTRACTING UNIT; 33: SPECIFIC PIXEL VALUE DETERMINING UNIT; 34: DECODING UNIT; and 35: QUANTIZED WIDTH EXTRACTING UNIT

DESCRIPTION OF THE PREFERRED EMBODIMENTS

Image encoding method and device, image decoding method and device, and an imaging device according to embodiments of the present invention will be described using the accompanying drawings. Note that in the drawings substantially the same members are denoted by the same reference numerals.

First Embodiment

Figure 3:
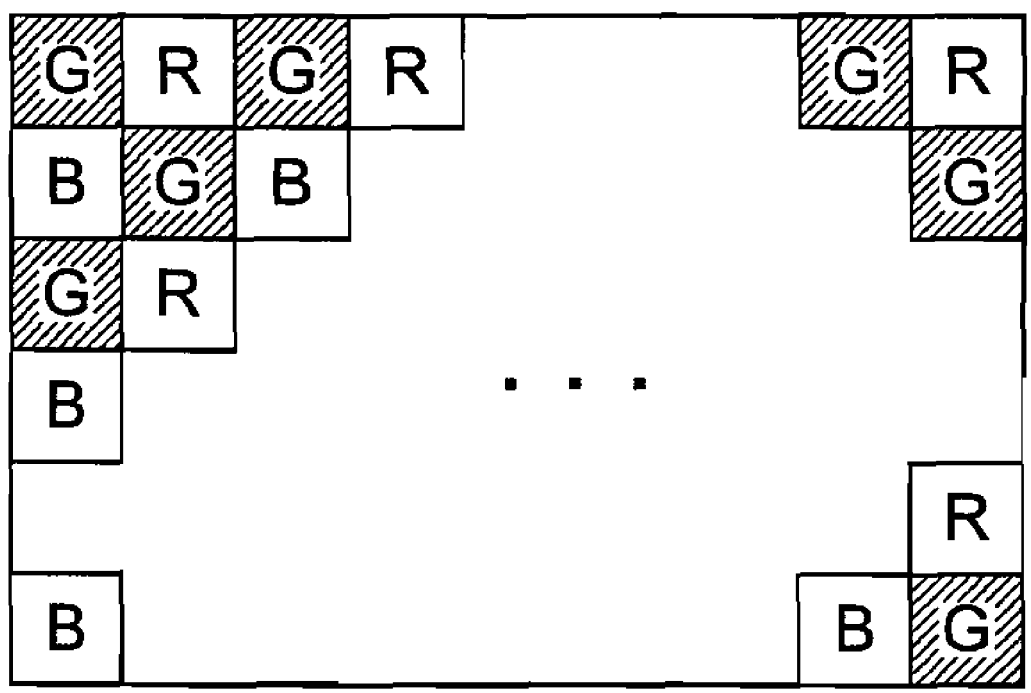
FIG. 3 is a schematic diagram showing the arrangement of filters of a Bayer array structure included in an imaging sensor in FIG. 1.

FIG. 1 is a block diagram showing an exemplary configuration for the case in which an image encoding device according to a first embodiment of the present invention is applied to a digital still camera (DSC). The digital camera includes an imaging lens 1, an imaging sensor 2, an ADC 3, a digital signal processing circuit 4, a memory 5, a recording unit 6, a lens control unit 7, and a sensor control unit 8. A subject entered through the imaging lens 1 is photoelectrically converted by the imaging sensor 2, digitized by the ADC (analog-digital converter) 3, and thereafter, inputted to the digital signal processing circuit 4. In the imaging sensor 2, pixels of three colors having color filters of a Bayer array structure shown in FIG. 3 are arranged. In FIG. 3, G, R, and B respectively represent green, red, and blue color filters. Pixel data on the respective colors of the pixels is outputted from the imaging sensor 2 in raster scan order and converted into brightness and color difference signal data by the digital signal processing circuit 4.

Figure 2:
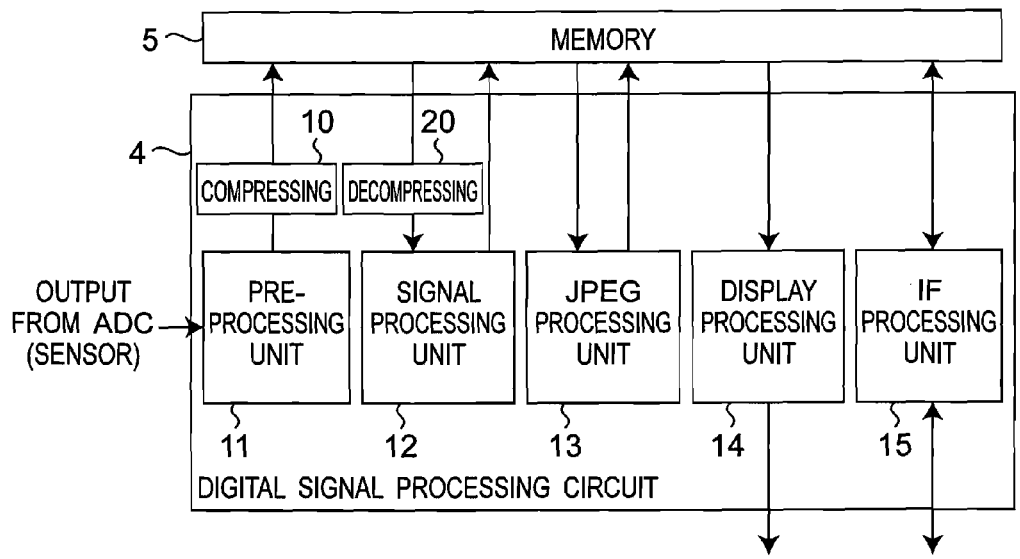
FIG. 2 is a block diagram showing the configuration of a digital signal processing circuit in FIG. 1.

FIG. 2 is a block diagram showing a detailed internal configuration of the aforementioned digital signal processing circuit 4. The digital signal processing circuit 4 includes a pre-processing unit 11, a signal processing unit 12, a JPEG processing unit 13, a display processing unit 14, an IF processing unit 15, a compressing unit 10, and a decompressing unit 20. Here, the compressing unit 10 and the decompressing unit 20 shown in FIG. 2 respectively correspond to an image encoding device and an image decoding device of the present invention.

The functions of the respective members will be described below. First, pixel data from the side of the imaging sensor 2 is inputted to the pre-processing unit 11. The pre-processing unit 11 performs a cutout process of an effective imaging area, a gamma correction process, an input pixel order rearrangement process, if necessary, a pixel value replacement process on defective pixel data in the imaging sensor 2, and the like.

Note that a location of the defective pixel data in the imaging sensor 2 can be found beforehand by obtaining light-shielding data of the imaging sensor 2 before shooting and upon shooting a pixel at that location the defective pixel data is replaced by a predetermined pixel value (specific pixel value) as information indicative of a defective pixel. When the predetermined pixel value (specific pixel value) indicative of defective pixel data is inputted, a subsequent-stage correction processing circuit interprets the inputted predetermined pixel value and thus performs a correction process.

The signal processing unit 12 reads out one-pixel one-color pixel data called raw data from the imaging sensor 2 which is temporarily stored in the memory 5 (hereinafter, referred to as raw data) to interpolate the other colors of RGB. For example, when a pixel value of R (red) is inputted, a process of interpolating G (green) and B (blue) at that pixel location from neighboring pixels is performed. When three-color pixel data units are assembled for one pixel, they are eventually converted into brightness and color difference data units and such data units are stored in the memory 5 again.

The JPEG processing unit 13 reads out the data that has been converted into the brightness and color difference data and performs a compression process called JPEG (Joint Photographic Experts Group). The pixel data compressed in JPEG format is stored in the memory 5 again and if necessary sent to the display processing unit 14 and the IF (interface) processing unit 15.

The display processing unit 14 performs a pixel data conversion process and an output timing synchronization process for outputting to an external display device or a display device of the main unit. The IF processing unit 15 performs a pixel data conversion process and an output timing synchronization process, for adaptation to an external memory device or transfer device.

The compressing unit 10 corresponds to an image encoding device according to the present invention, and compresses pixel array data which has been pre-processed by the pre-processing unit 11 and stores the compressed data in the memory 5. As will be described later, when a pixel value is a specific pixel value, the image encoding device of the present invention which is the compressing unit 10 determines that the specific pixel value is defective pixel data and thus performs encoding by allocating a specific quantized representative value. The decompressing unit 20 corresponds to an image decoding device according to the present invention, and decompresses raw data stored in the memory 5 and sends the decompressed data to the signal processing unit 12. When an encoded quantized representative value is the specific quantized representative value, the decompressing unit 20 determines that the specific quantized representative value is defective pixel data and thus performs decoding by allocating the specific pixel value. These processes will be described in detail below.

Figure 4:
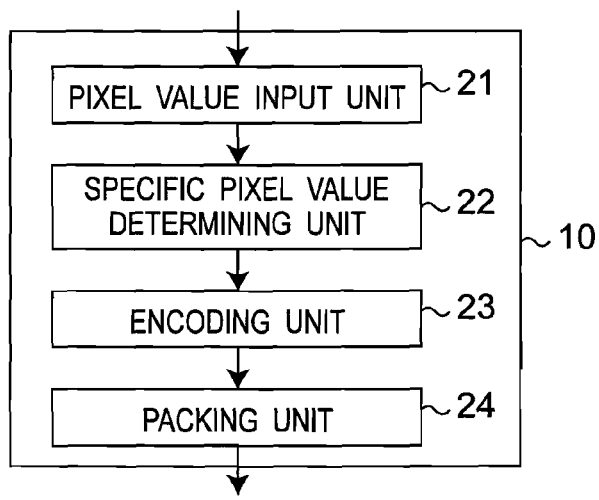
FIG. 4 is a block diagram showing the configuration of an image encoding device according to the first embodiment of the present invention.

FIG. 4 is a block diagram showing the configuration of the image encoding device 10 according to the first embodiment of the present invention. The image encoding device 10 includes a pixel input unit 21, a specific pixel value determining unit 22, an encoding unit 23, and a packing unit 24. The pixel input unit 21 receives a pre-processed pixel data string from the pre-processing unit 11. The specific pixel value determining unit 22 determines whether pixel values of the pixel data string are a specific pixel value. When a pixel value is the specific pixel value, the encoding unit 23 encodes the pixel value by allocating a specific quantized representative value and when the pixel value is not the specific pixel value, the encoding unit 23 encodes the pixel value by allocating one of quantized representative values other than the specific quantized representative value. The packing unit 24 packs the encoded quantized representative values in a predetermined unit, preferably multiples of a memory access bit width.

Figure 5:
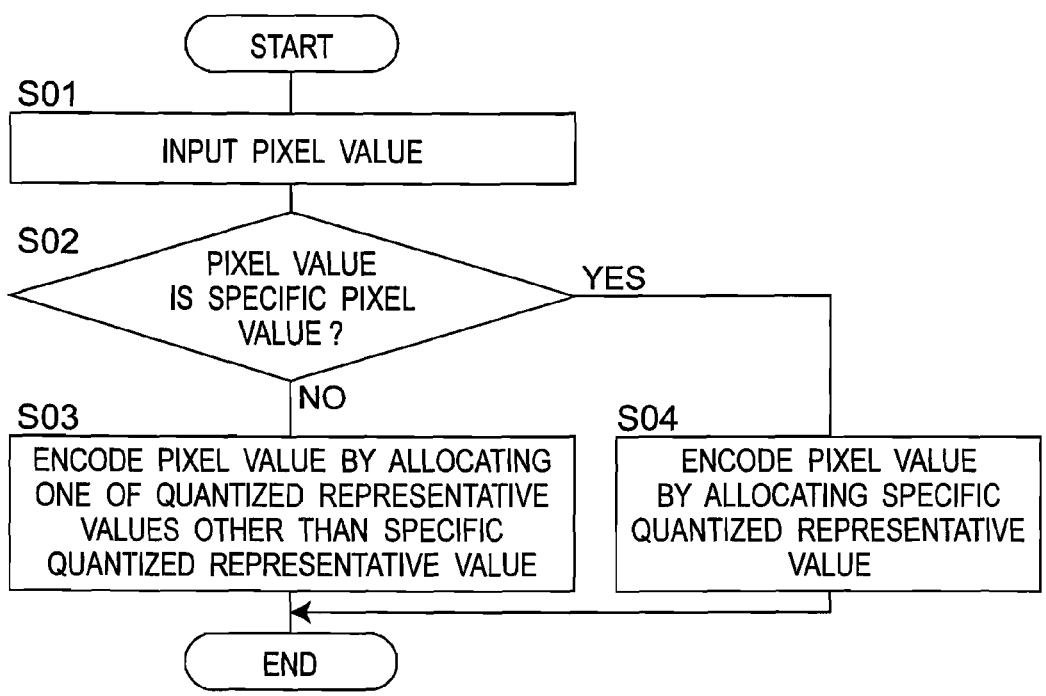
FIG. 5 is a flowchart of an image encoding method according to the first embodiment of the present invention.

FIG. 5 is a flowchart of an image encoding method according to the first embodiment of the present invention.

(a) An input of a pixel value is accepted (S01). Here, as shown in FIG. 2, a pre-processed pixel data string is accepted from the pre-processing unit 11.

(b) It is determined whether the pixel value is a specific pixel value (S02). Here, the specific pixel value is "0", for example, and when the pixel value is the specific pixel value, it means that the specific pixel value is defective pixel data. When the pixel value is the specific pixel value, the pixel value is encoded by allocating a specific quantized representative value (S04). Note that the specific pixel value to be allocated in advance to defective pixel data is not limited to "0". For example, the specific pixel value may be an upper limit value of pixel values to be represented.

(c) When the pixel value is not the specific pixel value, the pixel value is encoded by allocating one of quantized representative values other than the specific quantized representative value (S03). Here shows the case in which when an original pixel value is m bits, encoding is performed by allocating an n-bit quantized representative value. When n bits are smaller than the m bits, memory capacity can be reduced.

By the above-described manner, a pixel data string can be encoded.

By thus indicating defective pixel data by one quantized representative value representing a coded value, there is no need for information on a defective pixel to separately occupy a memory. In addition, when an encoded quantized representative value is a specific quantized representative value, it reveals that its original pixel value is defective pixel data, and thus, reversible encoding/decoding can be performed on the defective pixel data.

Second Embodiment

An image encoding device according to a second embodiment of the present invention is different from the image encoding device according to the first embodiment in that a pixel input unit 21 adds a predetermined offset value to a pixel value of each pixel. Here, the predetermined offset value is a value for preventing an m-bit pixel value from becoming a specific quantized representative value as a result of the m-bit pixel value being rounded by being encoded into an n-bit quantized representative value. Specifically, the offset value is $2^{(m-n)}-1$. For example, in the case of encoding a 10-bit (m=10) pixel value into a 6-bit (n=6) quantized representative value, when a pixel value is 1 to 15 ($=2^4-1$), if the pixel value is rounded to 6 bits, 0 is unfortunately obtained as a quantized representative value. In this case, the offset value ($2^{(10-6)}-1$) is 15($=2^4-1$). By adding this offset value to the pixel values of all pixels other than a specific pixel value, even when encoding is performed, the pixel values cannot be rounded to a specific quantized representative value. Accordingly, upon encoding, the specific pixel value is encoded by allocating the specific quantized representative value, but other pixel values are encoded by allocating any quantized representative value other than the specific quantized representative value without being rounded. Hence, reversible encoding/decoding can be performed on defective pixel data. In this case, in order that pixel values do not exceed an upper limit of m bits as a result of the addition of an offset value, a clipping process is performed to round these pixel values to $2^m-1$ which are the upper limit of the m bits.

Note that although here the specific pixel value is "0" and the specific quantized representative value is "0", the present invention is not limited thereto and the specific pixel value may be "$2^m-1$" and the specific quantized representative value may be "$2^n-1$" and an offset value may be subtracted.

Figure 6:
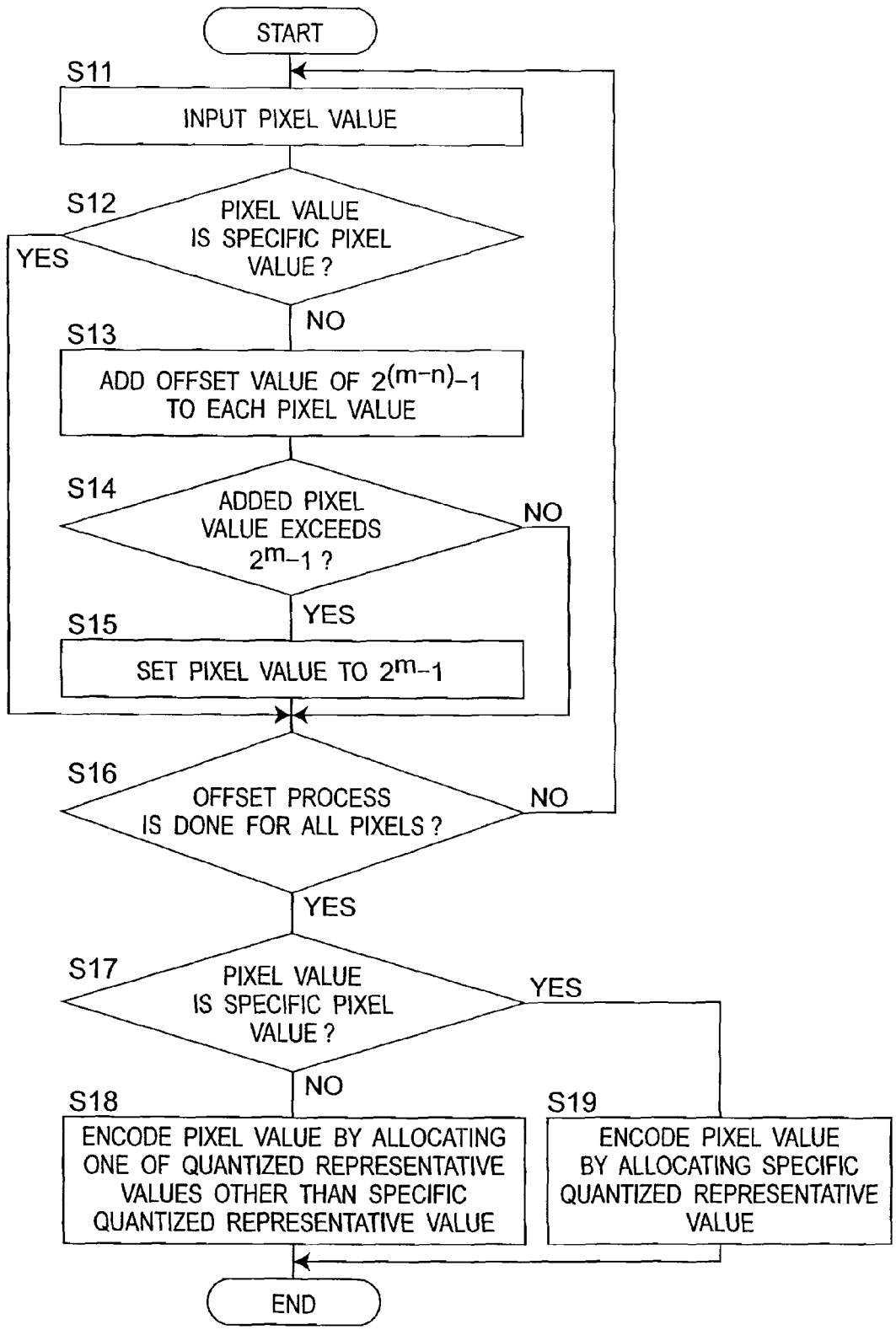
FIG. 6 is a flowchart of an image encoding method according to a second embodiment of the present invention.

FIG. 6 is a flowchart of an image encoding method according to the second embodiment of the present invention.

(a) An input of a pixel value (S11) is accepted.

(b) It is determined whether the pixel value is a specific pixel value (S12). Here, since an offset value is added to all pixel values other than the specific pixel value, it is determined whether the pixel value is the specific pixel value.

(c) An offset value of $2^{(m-n)}-1$ is added to each pixel value (S13).

(d) It is determined whether the pixel value that has gone through the offset value addition exceeds $2^m-1$ (S14). When the pixel value after the offset value addition exceeds m bits of its original pixel value, the pixel value cannot be represented by m bits in this state and thus the pixel value is set to $2^m-1$ (S15). By thus performing clipping when the pixel value exceeds the upper limit, part of information on its original data is lost, but since the clipped value is close to the upper limit it is considered that the loss is almost never recognized. On the other hand, when the pixel value does not exceed an m-bit range even after the offset value addition, the process moves to step S16.

(e) It is determined whether an offset process is done for all pixels (S16). If an offset process is completed for all pixels then the process moves to next step S17, and if not completed then the process returns to step S11.

(f) It is determined whether a pixel value is the specific pixel value (S17). If the pixel value is the specific pixel value, then the pixel value is encoded by allocating a specific quantized representative value (S19).

(g) If the pixel value is not the specific pixel value, then the pixel value is encoded by allocating one of quantized representative values other than the specific quantized representative value (S18).

By the above-described manner, image encoding can be performed by which from a pixel data string containing m-bit pixel values of pixels, a pixel data string of n-bit quantized representative values into which the pixel values are encoded is obtained. By thus adding an offset value, even when an original pixel value is in a range of 1 to $2^{(m-n)}-1$, the pixel value can be prevented from becoming a specific quantized representative value "0" as a result of the pixel value being rounded upon encoding.

Note that instead of the above-described offset process, data from the side of the imaging sensor 2 may be restricted in advance in the analog/digital converting unit 3 or input data may be restricted in advance in the pre-processing unit 11, to 0, $2^{(m-n)}$ to $2^m-1$.

Third Embodiment

Figure 7:
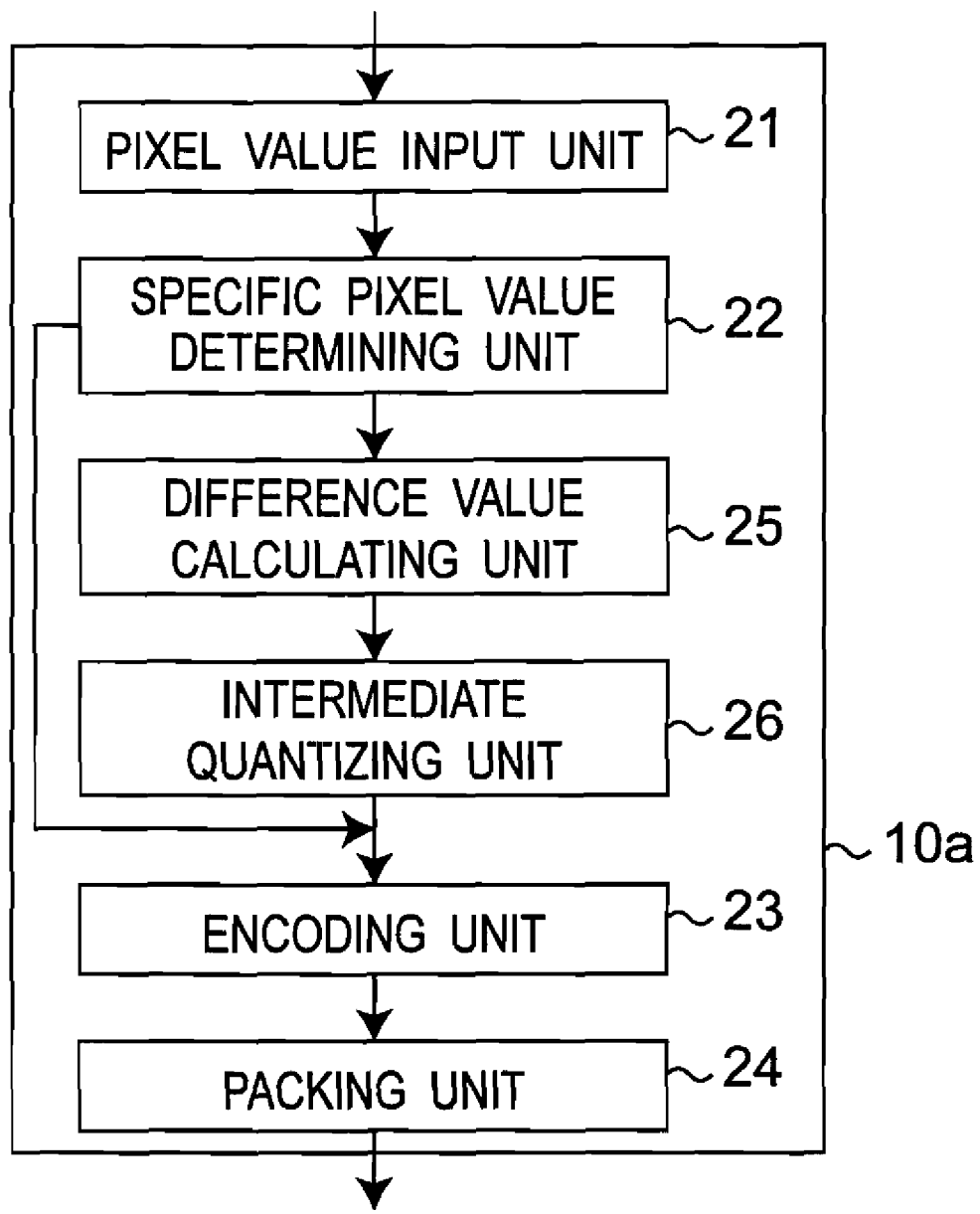
FIG. 7 is a block diagram showing the configuration of an image encoding device according to a third embodiment of the present invention.

FIG. 7 is a block diagram showing the configuration of an image encoding device 10a according to a third embodiment of the present invention. This image encoding device 10a is different from the image encoding device according to the first embodiment in that the image encoding device 10a includes a difference value calculating unit 25 and an intermediate quantizing unit 26. The difference value calculating unit 25 calculates a difference value between a pixel value of a first pixel and a pixel value of a second pixel neighboring the first pixel. The intermediate quantizing unit 26 determines k bits as minimum bits that can represent the aforementioned difference value and represents the aforementioned difference value by a k-bit quantized representative value. An encoding unit 23 encodes the k-bit quantized representative value into an n-bit quantized representative value. In this image encoding device, since a difference value but not a pixel value itself is encoded, when the difference value can be represented by an n-bit range, rounding upon encoding does not take place and thus reversible encoding/decoding can be performed.

Figure 8:
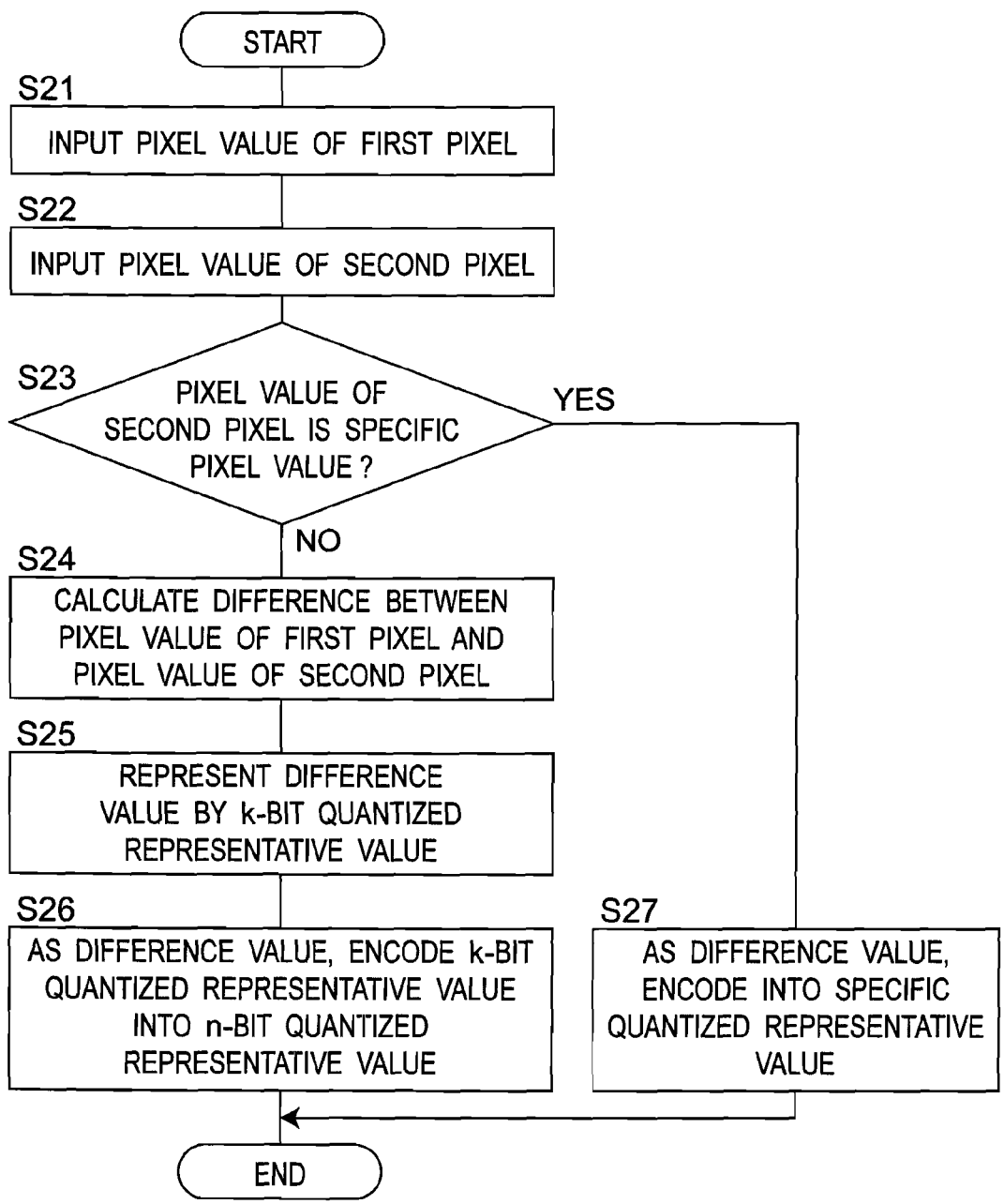
FIG. 8 is a flowchart of an image encoding method according to the third embodiment of the present invention.

FIG. 8 is a flowchart of an image encoding method according to the third embodiment of the present invention.

(a) An input of a pixel value of a first pixel is accepted (S21). In this case, it is assumed that the pixel value of the first pixel is not a specific pixel value.

Figure 9:
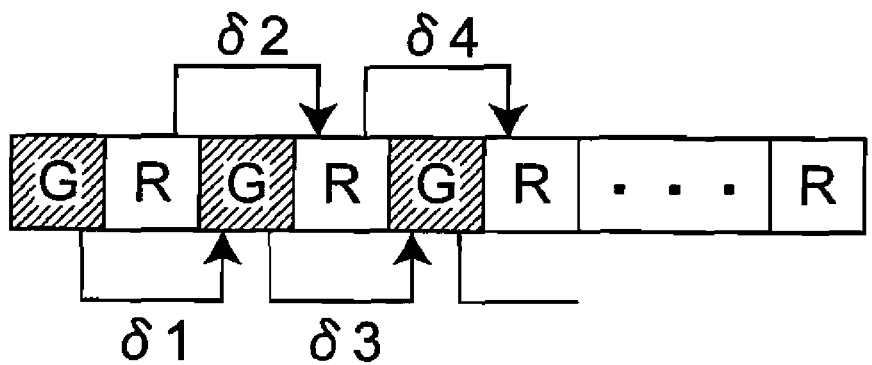
FIG. 9 is a schematic diagram showing the case of taking a difference value between pixels of the same color in the image encoding method according to the third embodiment of the present invention.
Figure 10:
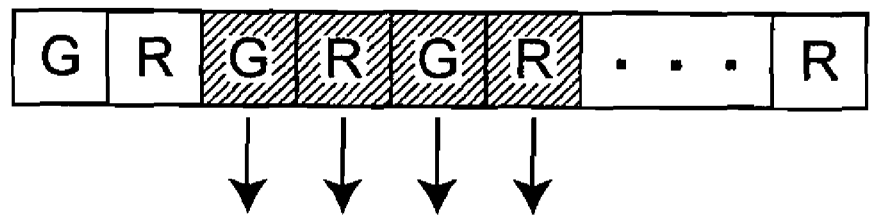
FIG. 10 is a schematic diagram showing the case of taking a difference value between adjacent pixels in the image encoding method according to the third embodiment of the present invention.

(b) An input of a pixel value of a second pixel is accepted (S22). As shown in FIG. 9, the second pixel may have the same color as the first pixel, and the second pixel may be located near the first pixel. Alternatively, as shown in FIG. 10, the second pixel may be a pixel adjacent to the first pixel.

(c) It is determined whether the pixel value of the second pixel is the specific pixel value (S23). If the pixel value is the specific pixel value, then as a difference value, it is encoded into a specific quantized representative value (S27). Note that in this case although the specific quantized representative value is stored as the difference value, it means that the pixel value of the second pixel is defective pixel data and thus upon decoding, by detecting that a difference value is the specific quantized representative value, the pixel value of the second pixel is encoded by allocating the specific pixel value indicative of defective pixel data.

(d) If the pixel value of the second pixel is not the specific pixel value, then a difference value δ between the pixel value of the first pixel and the pixel value of the second pixel is calculated (S24). Note that a set of the first pixel and the second pixel may be a set of pixels having the same color, and they may be located near each other, or they may be a set of pixels of different colors and they may be located adjacent to each other, as shown in FIGS. 9 and 10.

(e) The difference value δ is represented by a k-bit quantized representative value (S25). In this case, k bits are determined as minimum bits that can represent the aforementioned difference value δ.

(f) As the difference value, the k-bit quantized representative value is encoded into an n-bit quantized representative value (S26).

By the above-described mariner, from a pixel data string containing m-bit pixel values of pixels, a pixel data string can be obtained that contains n-bit quantized representative values into which difference values between the pixel values are encoded.

Next, the selection of a set of a first pixel and a second pixel which obtain a difference value will be described using FIGS. 9 to 13. When pixel values to be inputted from the imaging sensor 2 are IN(1), IN(2) ..., in raster order, a difference value δ can be represented as:

Difference value $\delta = IN(t) - IN(t-1)$ $t$: time.

Figure 11:
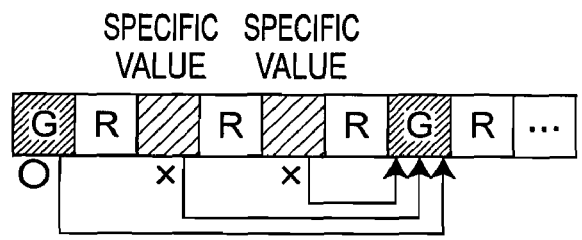
FIG. 11 is a schematic diagram showing how to take a difference value when a specific pixel value is continuously present in pixels of the same color in the image encoding method according to the third embodiment of the present invention.
Figure 12:
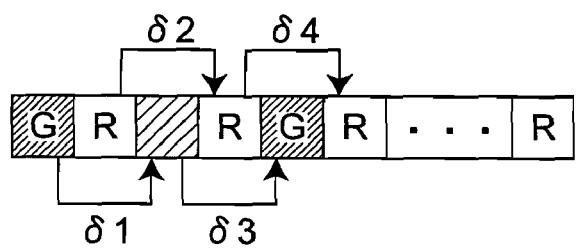
FIG. 12 is a schematic diagram showing an example of how to take a difference value when the specific pixel value is present in the image encoding method according to the third embodiment of the present invention.
Figure 13:
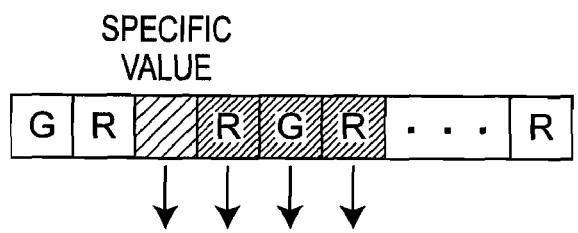
FIG. 13 is a schematic diagram showing an example of taking a difference value between adjacent pixels when the specific pixel value is present in the image encoding method according to the third embodiment of the present invention.

An input from an imaging sensor that adopts a Bayer array configuration such as that shown in FIG. 3 is made in a manner such that pixel values are inputted in order of R (red), G (green), R, G ..., for every horizontal line and G (green), B (blue), G, B ..., for a subsequent line. Hence, as a set of a first pixel and a second pixel, there is a set of pixels having the same color and located near each other, as shown in FIG. 9, and there is a set of pixels having different colors and located adjacent to each other, as shown in FIG. 10. When, as shown in FIG. 11, a pixel value of a pixel is a specific pixel value, this pixel is not used as a first pixel. In this case, a pixel whose pixel value is not the specific pixel value is selected as the first pixel. In the case of FIG. 12, for pixels of R (red), difference values δ2 and δ4 can be calculated directly. For a difference value δ1 between pixels of G (green), since this is a case in which a pixel value of a second pixel is the specific pixel value, instead of δ1, a specific quantized representative value is stored. On the other hand, since a pixel whose pixel value is the specific pixel value is not used as a first pixel, instead of δ3, a difference value is calculated using, as a first pixel, a pixel that does not have the specific pixel value, as in FIG. 11. Furthermore, as shown in FIG. 13, when a difference value is calculated between adjacent pixels, a pixel having the specific pixel value is not used as a first pixel.

Fourth Embodiment

An image encoding method according to a fourth embodiment of the present invention is different from the image encoding method according to the third embodiment in that when a k-bit quantized representative value that represents a difference value is a specific quantized representative value, the difference value is represented by a (k+1)-bit quantized representative value. Therefore, upon encoding a difference value, the specific quantized representative value can be avoided and thus when, upon decoding, the specific quantized representative value is detected, encoding by allocating the specific quantized representative value can be avoided and accordingly reversible encoding/decoding can be performed on a specific pixel value.

Figure 15:
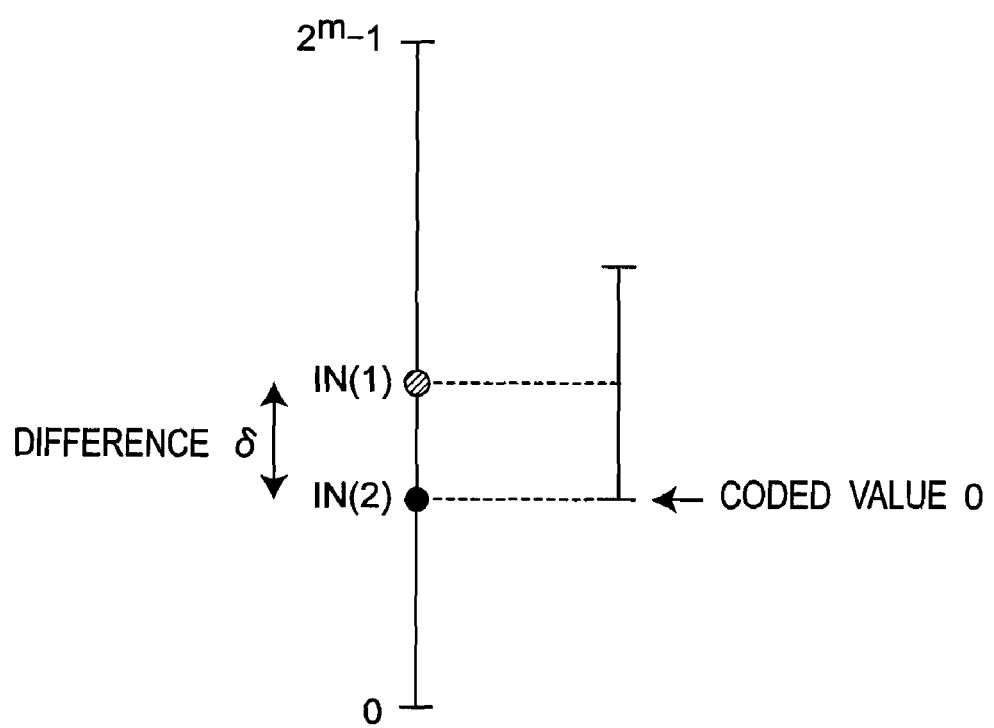
FIG. 15 is a schematic diagram showing the case in which a k-bit quantized representative value representing a difference value is "0"

FIG. 15 is a schematic diagram showing the case in which a k-bit quantized representative value that represents a difference value in the image encoding method is "0". Here, as a method for representing a difference value δ, there are a method for representing with a sign and a method for representing without a sign. When the difference value δ is represented by the representing method with a sign, in a k-bit range, a sign is included and thus difference values in a range of $-2^{k-1}-1$ to $2^{k-1}-1$ can be represented. On the other hand, in the representing method without a sign, a range of the aforementioned difference values can be represented by 0 to $2^k-1$. In this case, when a difference value is $-2^{k-1}-1$, the difference value is represented by "0". Hence, when a difference value is represented by a range of (k+1) bits instead of k bits, the same difference value of $-2^{k-1}-1$ can be represented not by "0" but by $2^{k-1}-1$ which is the (k+1) bits.

Figure 14:
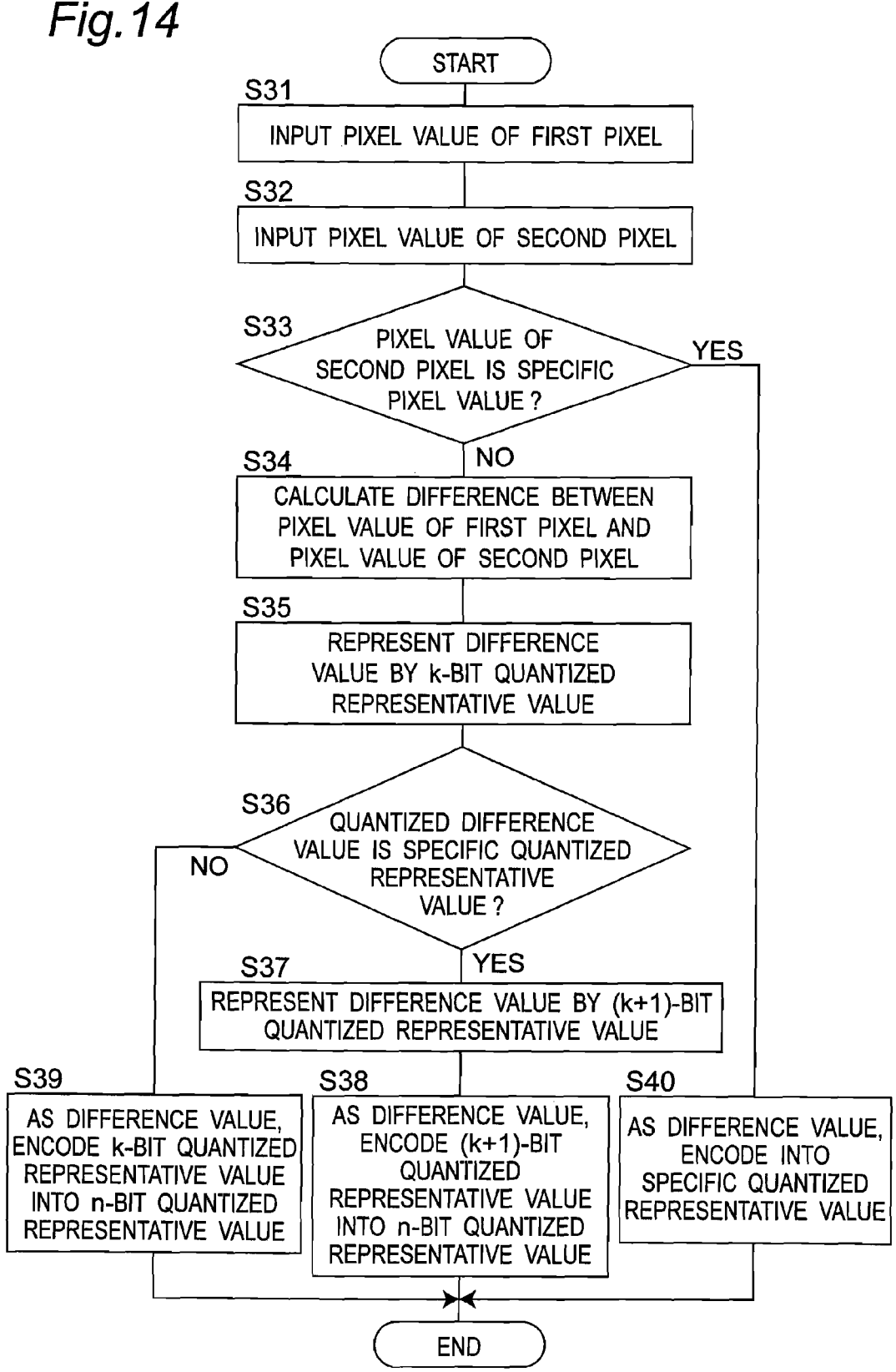
FIG. 14 is a flowchart of an image encoding method according to a fourth embodiment of the present invention.

FIG. 14 is a flowchart of the image encoding method according to the fourth embodiment of the present invention.

(a) An input of a pixel value of a first pixel is accepted (S31).

(b) An input of a pixel value of a second pixel is accepted (S32).

(c) It is determined whether the pixel value of the second pixel is a specific pixel value (S33). If the pixel value is the specific pixel value, then as a difference value, it is encoded into a specific quantized representative value (S40).

(d) A difference value δ between the pixel value of the first pixel and the pixel value of the second pixel is calculated (S34).

(e) The difference value is represented by a k-bit quantized representative value (S35). In this case, k bits are determined as minimum bits that can represent the aforementioned difference value δ.

(f) It is determined whether the k-bit quantized representative value is the specific quantized representative value (S36). As shown in FIG. 15, in the case of representing the difference value δ by k bits without a sign, when the difference value δ corresponds with $-2^{k-1}-1$, "0" is obtained as an encoded quantized representative value. Hence, the number of bits representing the difference value is increased and then the difference value is represented by a (k+1)-bit quantized representative value (S37). Accordingly, a specific quantized representative value "0" can be avoided.

(g) Subsequent to step S37, as the difference value, the (k+1)-bit quantized representative value is encoded into an n-bit quantized representative value (S38).

(h) If it is determined in step S36 that the k-bit quantized representative value is not the specific quantized representative value, then as the difference value, the k-bit quantized representative value is encoded into an n-bit quantized representative value (S39).

By the above-described manner, from a pixel data string containing m-bit pixel values of pixels, a pixel data string can be obtained that contains n-bit quantized representative values into which difference values between the pixel values are encoded.

Fifth Embodiment

An image encoding method according to a fifth embodiment of the present invention is different from the image encoding method according to the fourth embodiment in that when a k-bit quantized representative value that represents a difference value is a specific quantized representative value, the difference value is encoded into an n-bit specific quantized representative value. For example, the difference value is encoded into "1" other than "0" that corresponds to a specific pixel value. Therefore, encoding can be performed avoiding the specific quantized representative value that corresponds to the specific pixel value and thus when, upon decoding, the specific quantized representative value is detected, reversible encoding/decoding can be performed on the specific pixel value.

Figure 16:
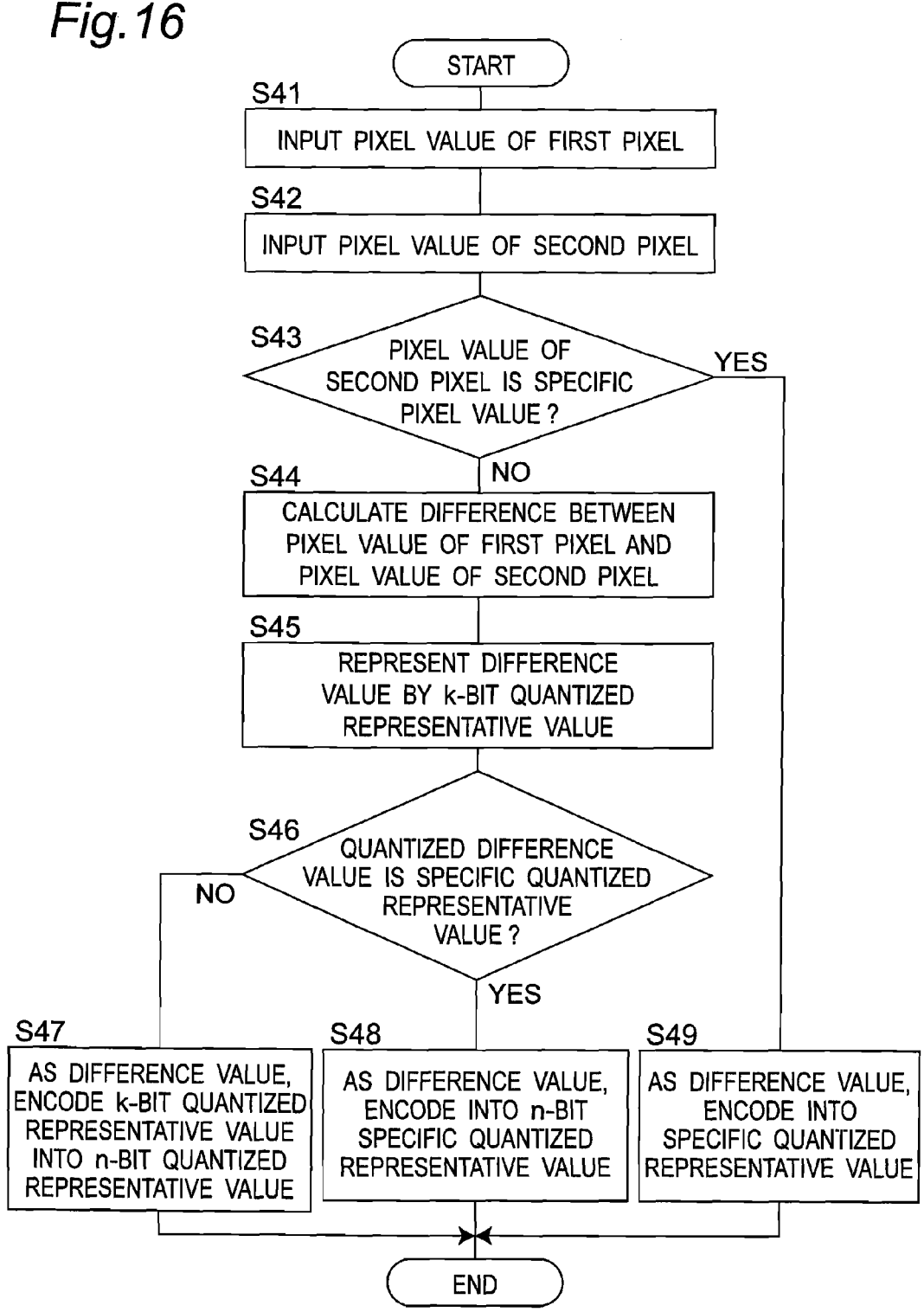
FIG. 16 is a flowchart of an image encoding method according to a fifth embodiment of the present invention.

FIG. 16 is a flowchart of the image encoding method according to the fifth embodiment of the present invention.

(a) An input of a pixel value of a first pixel is accepted (S41).

(b) An input of a pixel value of a second pixel is accepted (S42).

(c) It is determined whether the pixel value of the second pixel is a specific pixel value (S43). If the pixel value is the specific pixel value, then as a difference value, it is encoded into a specific quantized representative value (S49).

(d) A difference between the pixel value of the first pixel and the pixel value of the second pixel is calculated (S44).

(e) A difference value is represented by a k-bit quantized representative value (S45).

(f) It is determined whether the k-bit quantized representative value is the specific quantized representative value (S46). If the value is the specific quantized representative value, then as the difference value, it is encoded into an n-bit specific quantized representative value (S48). For example, it is encoded into "1" other than "0" that corresponds to the specific pixel value.

(g) As the difference value, the k-bit quantized representative value is encoded into an n-bit quantized representative value (S47).

By the above-described manner, from a pixel data string containing m-bit pixel values of pixels, a pixel data string can be obtained that contains n-bit quantized representative values into which difference values between the pixel values are encoded.

Sixth Embodiment

An image encoding method according to a sixth embodiment of the present invention is different from the image encoding methods according to the fourth and fifth embodiments in that when an n-bit quantized representative value is a specific quantized representative value, the value is encoded into an n-bit specific quantized representative value. For example, the value is encoded into "1" other than "0" that corresponds to a specific pixel value. Therefore, encoding can be performed avoiding the specific quantized representative value that corresponds to the specific pixel value and thus when, upon decoding, the specific quantized representative value is detected, reversible encoding/decoding can be performed on the specific pixel value.

Figure 17:
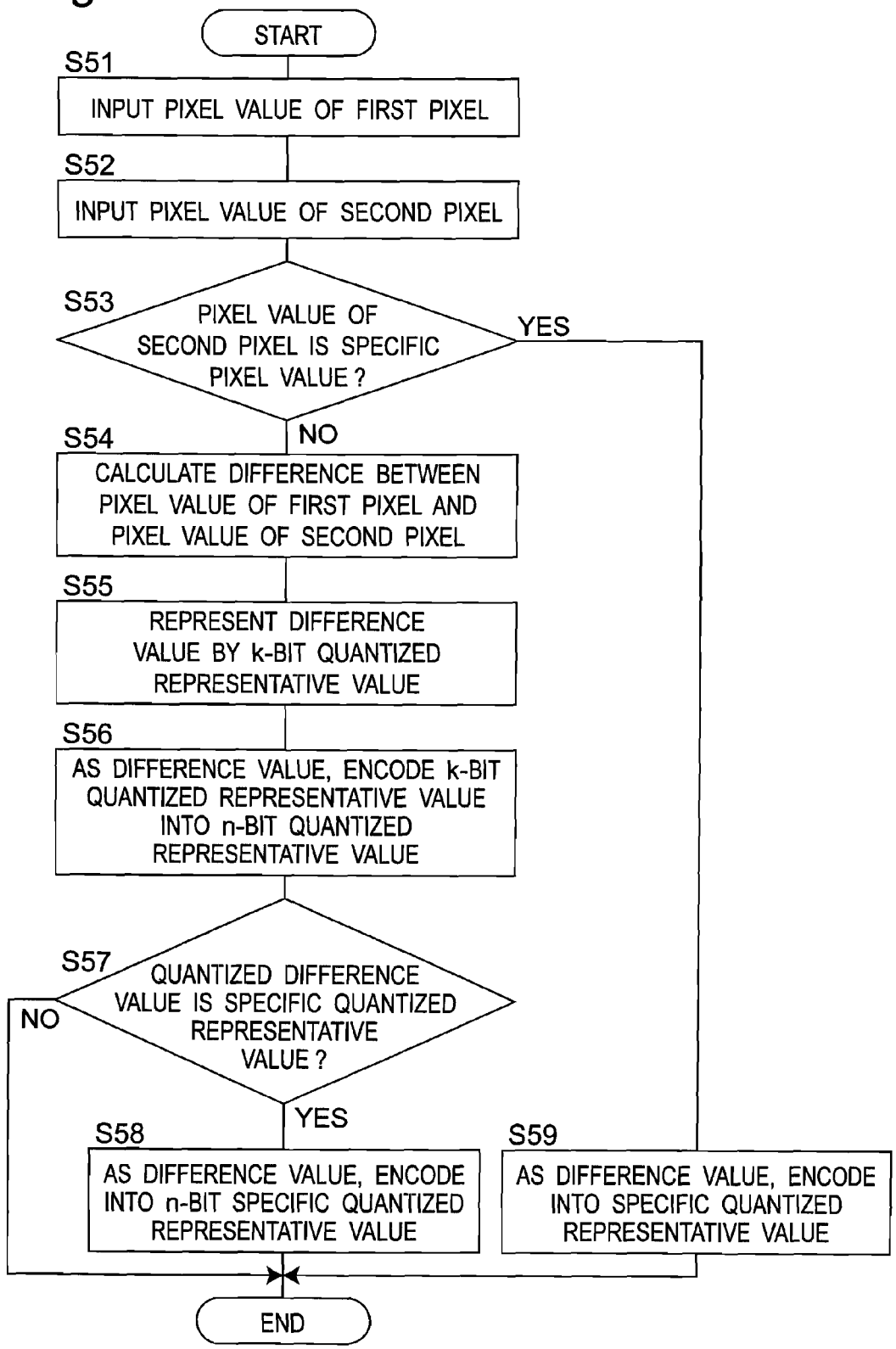
FIG. 17 is a flowchart of an image encoding method according to a sixth embodiment of the present invention.

FIG. 17 is a flowchart of the image encoding method according to the sixth embodiment of the present invention.

(a) An input of a pixel value of a first pixel is accepted (S51).

(b) An input of a pixel value of a second pixel is accepted (S52).

(c) It is determined whether the pixel value of the second pixel is a specific pixel value (S53). If the pixel value is the specific pixel value, then as a difference value, it is encoded into a specific quantized representative value (S59).

(d) A difference value between the pixel value of the first pixel and the pixel value of the second pixel is calculated (S54).

(e) The difference value is represented by a k-bit quantized representative value (S55). In this case, k bits are determined as minimum bits that can represent the difference value.

(f) As the difference value, the k-bit quantized representative value is encoded into an n-bit quantized representative value (S56).

(g) It is determined whether the n-bit quantized representative value is the specific quantized representative value (S57). If the value is the specific quantized representative value, then as the difference value, it is encoded into an n-bit specific quantized representative value (S58). For example, it is encoded into "1" other than "0" that corresponds to the specific pixel value. If it is determined that the value is not the specific quantized representative value, then no particular process is required and thus the process thereby ends.

By the above-described manner, from a pixel data string containing m-bit pixel values of pixels, a pixel data string can be obtained that contains n-bit quantized representative values into which difference values between the pixel values are encoded.

Seventh Embodiment

Figure 18:
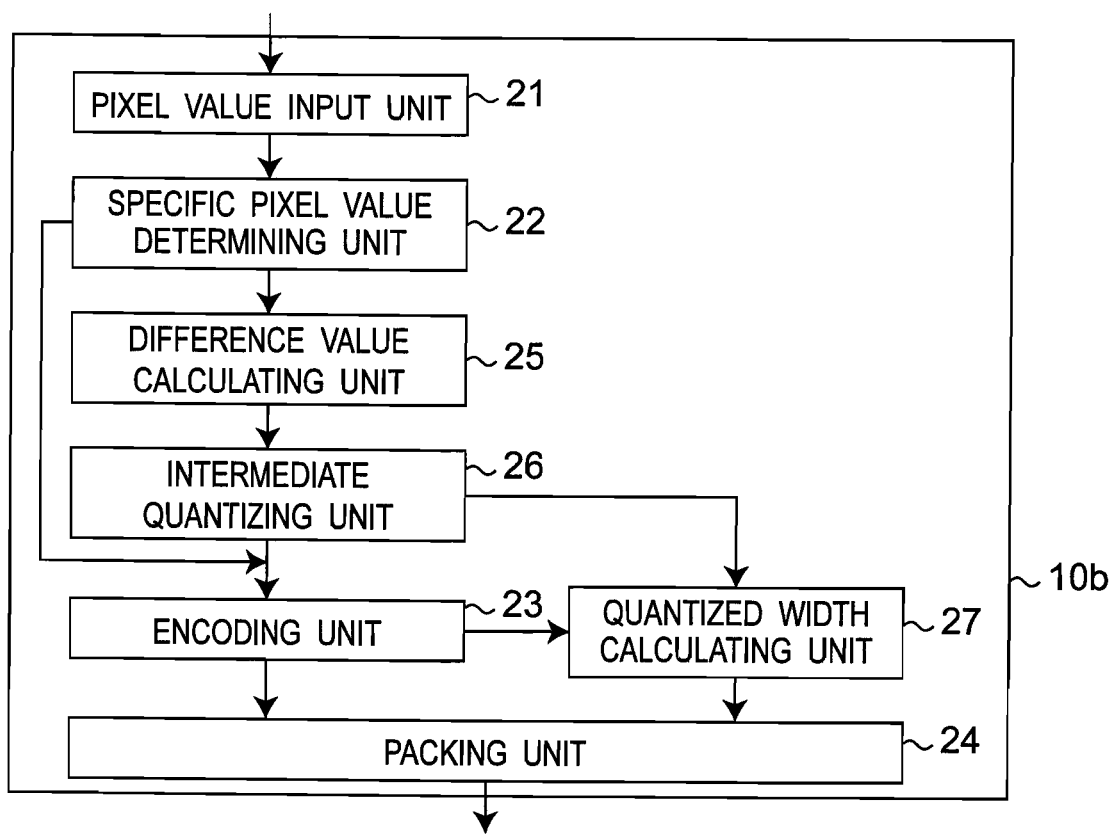
FIG. 18 is a block diagram showing the configuration of an image encoding device according to a seventh embodiment of the present invention.

FIG. 18 is a block diagram showing the configuration of an image encoding device according to a seventh embodiment of the present invention. This image encoding device 10b is different from the image encoding device according to the third embodiment in that the image encoding device 10b includes a quantized width calculating unit 27. The quantized width calculating unit 27 calculates a quantized width that represents a degree of compression of an encoded difference value δ. Accordingly, even when a difference value δ exceeds an n-bit width, the difference value δ can be compressed and represented by an n-bit quantized representative value, and upon decoding the n-bit quantized representative value can be decompressed to its original difference value δ based on a quantized width representing a degree of compression.

Figure 19:
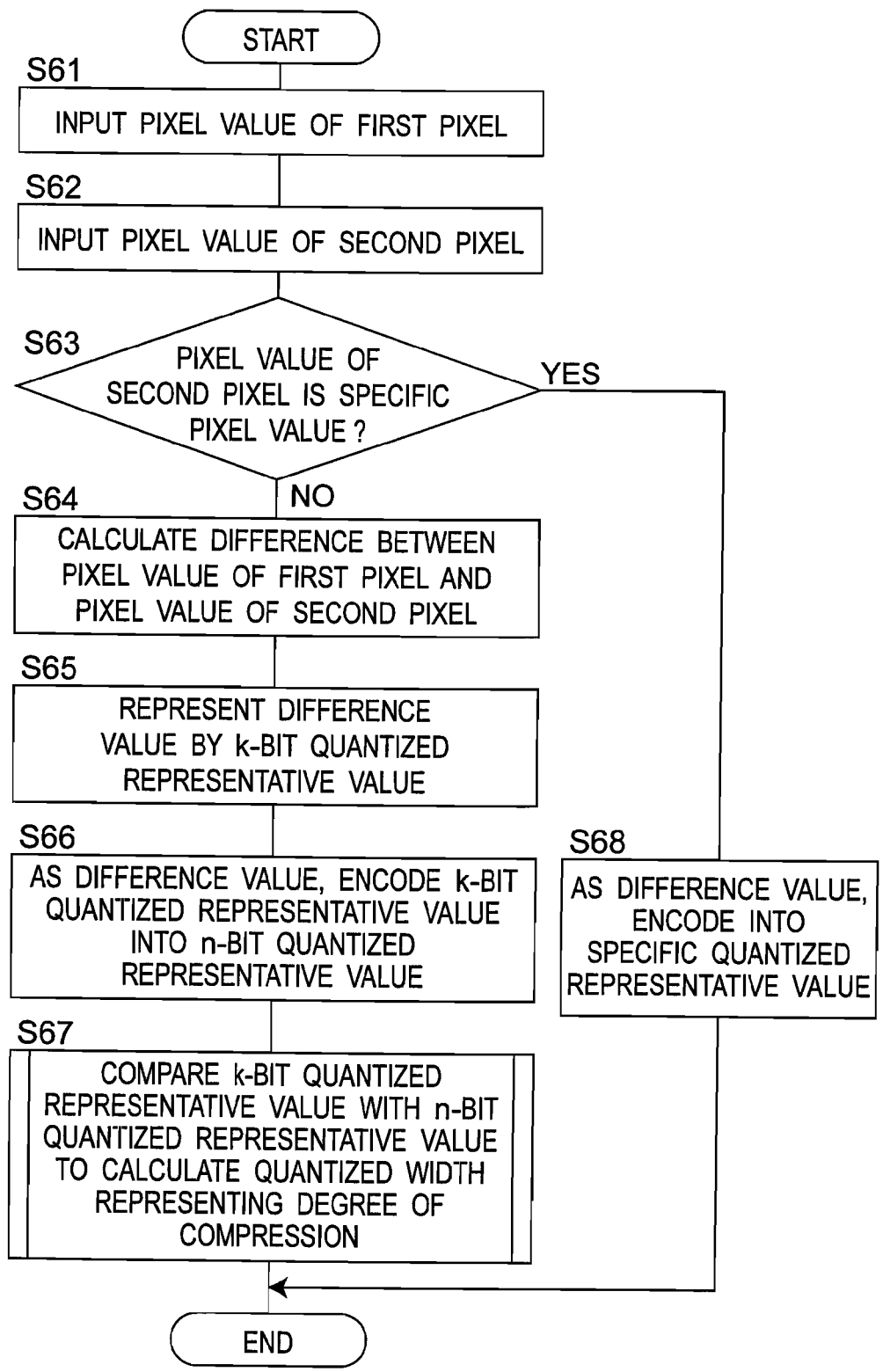
FIG. 19 is a flowchart of an image encoding method according to the seventh embodiment of the present invention.

FIG. 19 is a flowchart of an image encoding method according to the seventh embodiment of the present invention.

(a) An input of a pixel value of a first pixel is accepted (S61).

(b) An input of a pixel value of a second pixel is accepted (S62).

(c) It is determined whether the pixel value of the second pixel is a specific pixel value (S63). If the pixel value is the specific pixel value, then as a difference value, it is encoded into a specific quantized representative value (S68).

(d) A difference value between the pixel value of the first pixel and the pixel value of the second pixel is calculated (S64).

(e) The difference value is represented by a k-bit quantized representative value (S65). In this case, k bits are determined as minimum bits that can represent the difference value.

(f) As the difference value, the k-bit quantized representative value is encoded into an n-bit quantized representative value (S66). If, at this time, k bits exceed n bits, then the value is compressed and encoded.

(g) The k-bit quantized representative value is compared with the n-bit quantized representative value to calculate a quantized width representing a degree of compression of the encoded difference value δ (S67). Note that the detail of the calculation of a quantized width will be described later.

By the above-described manner, from a pixel data string containing m-bit pixel values of pixels, a pixel data string can be obtained that contains n-bit quantized representative values into which difference values between the pixel values are encoded.

Figure 20:
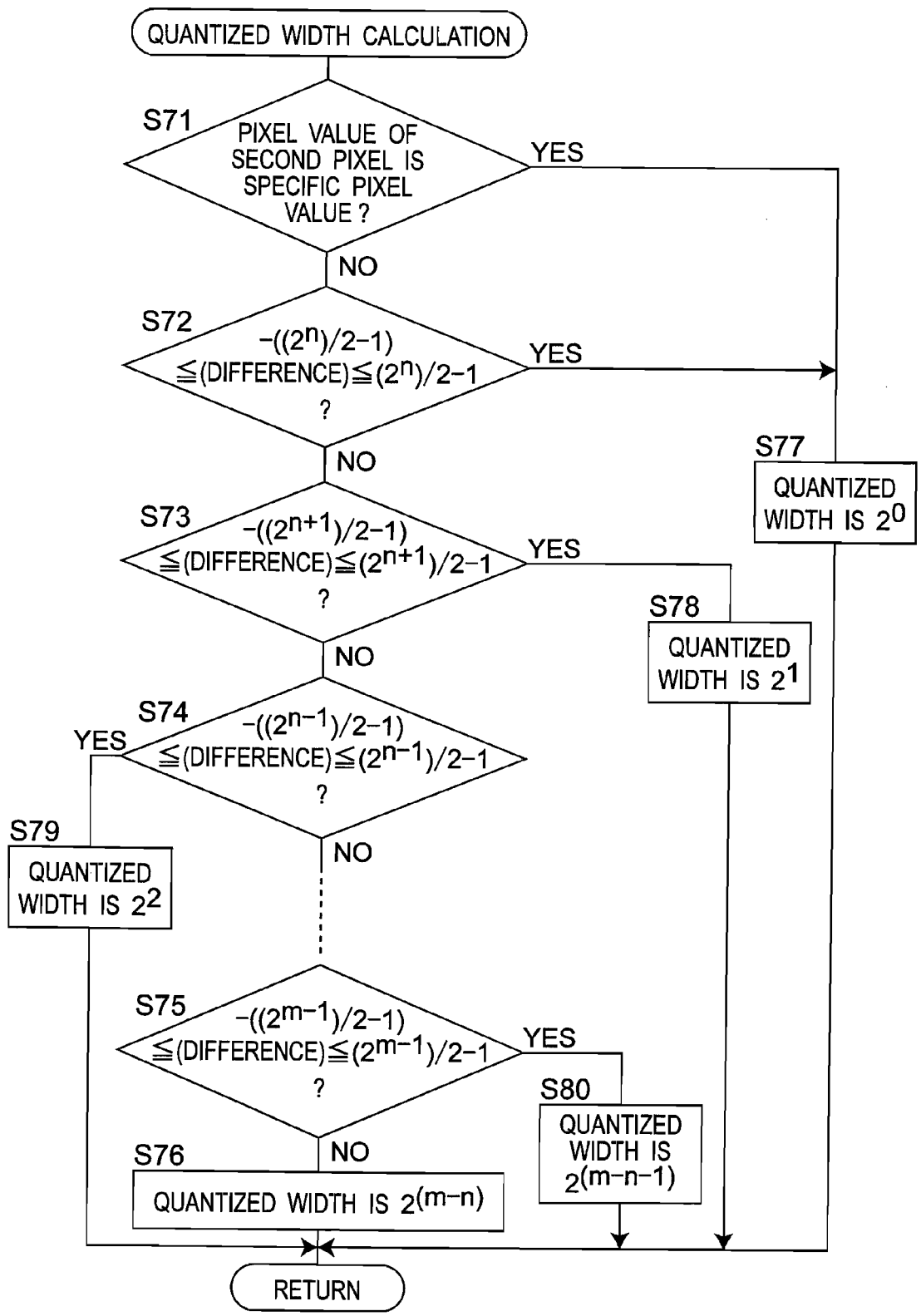
FIG. 20 is a flowchart showing the detail of step S67 in FIG. 19.

FIG. 20 is a flowchart describing the detail of step S67 in FIG. 19 where a quantized width is calculated.

(a) It is determined whether the pixel value of the second pixel is the specific pixel value (S71). If the pixel value is the specific pixel value, then when, for example, a specific value of "0" is allocated as the specific quantized representative value as the difference value, such a value can be obviously represented within an n-bit dynamic range and thus compression is not required. Therefore, a quantized width representing a degree of compression of the encoded difference value δ is $2^0$ (S77).

(b) It is determined whether the difference value δ satisfies an inequality $-((2^n)/2-1) \leq (\text{difference } \delta) \leq (2^n)/2-1$ (S72). If the difference value δ is within a range of this inequality, then the difference value δ can be represented by the n-bit dynamic range and thus a quantized width representing a degree of compression of the encoded difference value δ is $2^0$ (S77).

(c) It is determined whether the difference value δ satisfies an inequality $-((2^{n+1})/2-1) \leq (\text{difference } \delta) \leq (2^{n+1})/2-1$ (S73). If the difference value δ is within a range of this inequality, then an n+1-bit dynamic range is required to represent the difference value δ, and thus, a quantized width representing a degree of compression of the encoded difference value δ is $2^1$ (S78).

(d) It is determined whether the difference value δ satisfies an inequality $-((2^{n+2})/2-1) \leq (\text{difference } \delta) \leq (2^{n+2})/2-1$ (S74). If the difference value δ is within a range of this inequality, then an (n+2)-bit dynamic range is required to represent the difference value δ, and thus, a quantized width representing a degree of compression of the encoded difference value δ is $2^2$ (S79).

(e) It is determined whether the difference value δ satisfies an inequality $-((2^{m-1})/2-1) \leq (\text{difference } \delta) \leq (2^{m-1})/2-1$ (S75). If the difference value δ is within a range of this inequality, then an (m−1)-bit dynamic range is required to represent the difference value δ, and thus, a quantized width representing a degree of compression of the encoded difference value δ is $2^{m-n-1}$ (S78).

(f) On the other hand, if the difference value δ does not satisfies the inequality $-((2^{m-1})/2-1) \leq (\text{difference } \delta) \leq (2^{m-1})/2-1$, then an m-bit dynamic range is required to represent the difference value δ, and thus, a quantized width representing a degree of compression of the encoded difference value δ is $2^{(m-n)}$ (S76).

By the above-described manner, a quantized width is calculated. Thereafter, the process returns.

Figure 21:
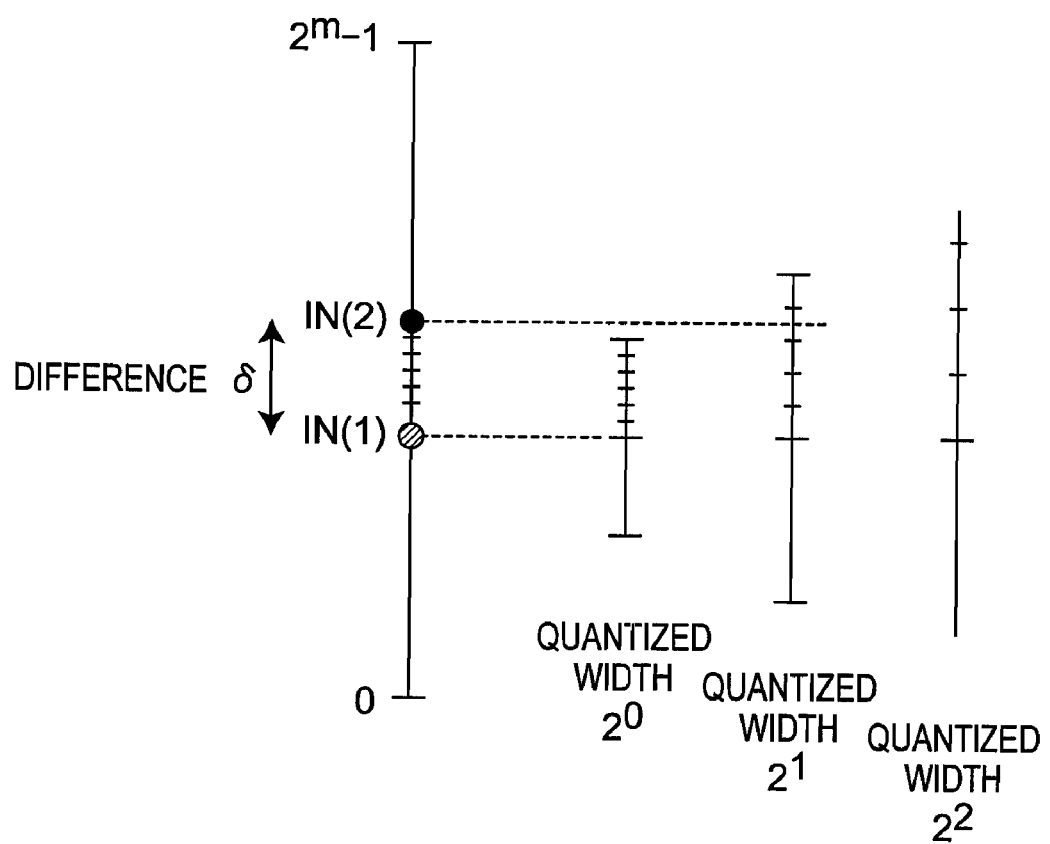
FIG. 21 is a schematic diagram showing an example of determining a quantized width.

FIG. 21 is a schematic diagram showing an example of determining a quantized width. In this example, it is assumed that a pixel value of a first pixel is IN(1) and a pixel value of a second pixel is IN(2). Also, there are shown three vertical scales having different graduations with the pixel value IN(1) of the first pixel being a base point. Of the three scales, a first scale with the smallest graduation indicates a range of n-bit quantized representative values to be encoded:

$$-((2^n)/2-1) \text{ to } (2^n)/2-1.$$

On the other hand, a second scale is a scale having a graduation twice that of the first scale. In the second scale, the values of the same n-bit quantized representative values as those in the first scale indicate values twice as large and the second scale indicates a range of n+1-bit quantized representative values:

$$-((2^{n+1})/2-1) \text{ to } (2^{n+1})/2-1.$$

Furthermore, a third scale is a scale having a graduation four times that of the first scale. In the third scale, the values of the same n-bit quantized representative values as those in the first scale indicate values four times as large and the third scale indicates a range of n+2-bit quantized representative values:

$$-((2^{n+2})/2-1) \text{ to } (2^{n+2})/2-1.$$

That is, the graduation indicates a quantized width representing a degree of compression at which a difference value δ is compressed to an n-bit range.

In the example of FIG. 21, to represent a difference δ between the pixel value IN(1) of the first pixel and the pixel value IN(2) of the second pixel, the second scale is required. Therefore, in this case, a quantized width representing a degree of compression of an n-bit quantized representative value of the difference value is $2^1$. Upon decoding, the n-bit quantized representative value of the difference value is multiplied by a factor of $2^1$ and the result is added to the pixel value of the first pixel, whereby the pixel value of the second pixel can be obtained.

Note that although the above example describes the case in which a quantized width is calculated for each individual difference value δ, the present invention is not limited thereto; for example, as shown in FIG. 10, one quantized width may be determined for difference values δ1, δ2, δ3, and δ4 between each of four consecutive pixels and a pixel adjacent to and immediately before that pixel. In this case, given that the quantized widths of the difference values δ1, δ2, δ3, and δ4 are p(1), p(2), p(3), and p(4), a quantized width pmax for a set is determined as shown in the following equation as a maximum quantized width for the four quantized widths:

$$p\text{max}=\text{MAX}(p(1),p(2),p(3),p(4))$$

where MAX( ) is a process of returning a maximum value.

For example, when the four quantized widths are:

$$p(1)=2^2$$

$$p(2)=2^1$$

$$p(3)=2^2$$

$$p(4)=2^0,$$

by pmax=MAX($2^2$, $2^1$, $2^2$, $2^0$)=$2^2$=4, 4 is obtained as the quantized width pmax for the set. Hence, based on the quantized width pmax for the set, the difference values δ1, δ2, δ3, and δ4 are encoded as n-bit quantized representative values.

Although here a quantized width is determined with four pixels as a set, the present invention is not limited thereto and any number of pixels can be used as long as the number of pixels is one or greater. When a quantized width for a set is determined in an n-pixel unit, the quantized width is determined as follows:

$$p=\text{MAX}(p(t),p(t+1),\ldots,p(t+n-1)).$$

Since the specific pixel value is encoded into a specific quantized representative value "0" as a difference value, a quantized width thereof is set to a minimum quantized width of $2^0$. Therefore, even when, as shown in FIG. 13, a set includes the specific pixel value, a quantized width for the set cannot be affected.

When the quantized width for the set is determined, in an intermediate quantizing unit 26 and an encoding unit 23, a bit accuracy of input pixel values, a bit accuracy to be encoded, the number of bits to be compressed, a pixel value of a first pixel, a pixel value of a second pixel, a quantized width, a quantized dynamic range, encoded data, etc., are set. Then, based on a predetermined pseudo code, a difference value between the pixel value of the first pixel and the pixel value of the second pixel is encoded into a quantized representative value based on the aforementioned quantized width.

Description will be made below using specific numeric values. The case is considered in which a 10-bit (m=10) input pixel is compressed to a 6-bit (n=6) quantized representative value.

Pixel value of a first pixel: IN(2)=150
Pixel value of a second pixel: IN(1)=200
Difference value: δ=IN(2)−IN(1)=50

Here, considering the case in which the difference value is represented without a sign, a 6-bit representable range is a range of $-2^{6-1}-1$ to $2^{6-1}-1$ of the difference value δ, i.e., a range of −32 to 32. In this example, the difference value can be represented by a 7-bit range of $-2^6$ to $2^6$, and thus, a quantized width p thereof is $2^1$. Here, the case is considered in which a quantized width pmax for a set is $2^1$ as well. In this case, a dynamic range D is: pmax×$2^n$=$2^1$×$2^6$=128.

(a) For an assumed fiducial value Sa, by Sa=IN(1)−D=150−128=22, Sa=22 is obtained.

(b) Since the assumed fiducial value Sa is positive, 22 which is the same value as Sa is given as a fiducial value F.

(c) Subsequently, for a difference In of the pixel value IN(2) of the second pixel from the fiducial value F, by In=IN(2)−F−1=200−22−1=177, 177 is obtained.

(d) The obtained difference In is 177 and thus cannot be represented by a 6-bit range and therefore the difference In is compressed by a quantized width of $2^1$ and encoded as a 6-bit range quantized representative value ENC. Specifically, an operation of shifting right one bit is performed on "177", whereby 88 of 6 bits (=101100) is obtained.

Note that upon decoding, based on a quantized width of $2^1$, an operation of shifting left one bit is reversely performed on an ENC value of 88 which is a 6-bit quantized representative value, whereby "176" is obtained. Then, 176 is added to a fiducial value of 22, whereby 199 can be decoded as the pixel value of the second pixel.

Encoding results are packed, as shown in FIGS. 22 (*a*) and (*b*), in a predetermined unit, e.g., multiples of a memory access width. FIG. 22 (*a*) is a schematic diagram showing the case in which for data on two colors of R (red) and G (green), the data is stored as it is in their respective bit accuracies (m bits) of pixel values which are initial values and as quantized width information pmax and encoded n-bit data are stored. FIG. 22 (*b*) is a schematic diagram showing the case in which data is stored so as to be separately arranged between colors of R (red) and G (green). Note that either FIG. 22 (*a*) or (*b*) can be used. In this case, only a data fetching procedure varies upon decoding and thus a compression process is not affected.

Eighth Embodiment

Figure 23:
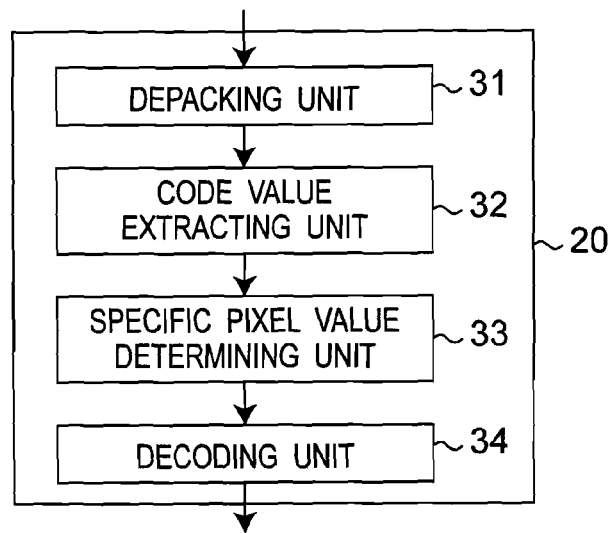
FIG. 23 is a block diagram showing the configuration of an image decoding device according to an eighth embodiment of the present invention.

FIG. 23 is a block diagram showing the configuration of an image decoding device 20 according to an eighth embodiment of the present invention. This image decoding device 20 includes a depacking unit 31, a code value extracting unit 32, a specific pixel value determining unit 33, and a decoding unit 34. The depacking unit 31 depacks an encoded pixel data string. The code value extracting unit 32 extracts an encoded quantized representative value. The specific pixel value determining unit 33 determines whether the quantized representative value is a specific quantized representative value. When the value is the specific quantized representative value, it means that its original pixel value is defective pixel data, and thus, the decoding unit 34 performs decoding by allocating a specific pixel value. When the value is not the specific quantized representative value, the decoding unit 34 performs decoding by allocating a pixel value other than the specific pixel value. By thus encoding defective pixel data by allocating in advance the specific quantized representative value, there is no need to separately save information on the defective pixel data in a memory. In addition, by determining whether a quantized representative value is the specific quantized representative value, compression of a pixel value becomes irreversible encoding but reversible encoding/decoding can be performed on the defective pixel data.

Figure 24:
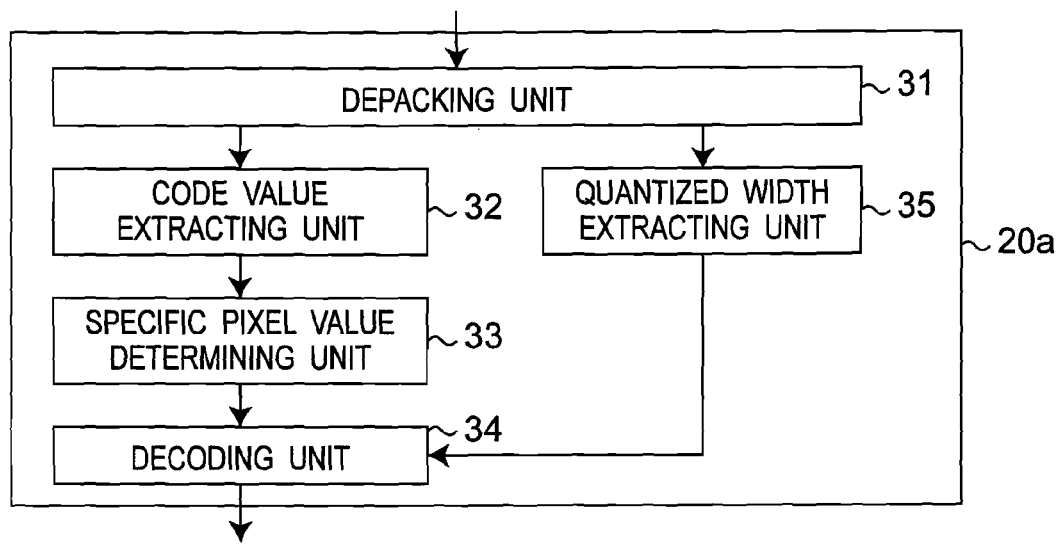
FIG. 24 is a block diagram showing the configuration of an image decoding device according to a tenth embodiment of the present invention.
Figure 25:
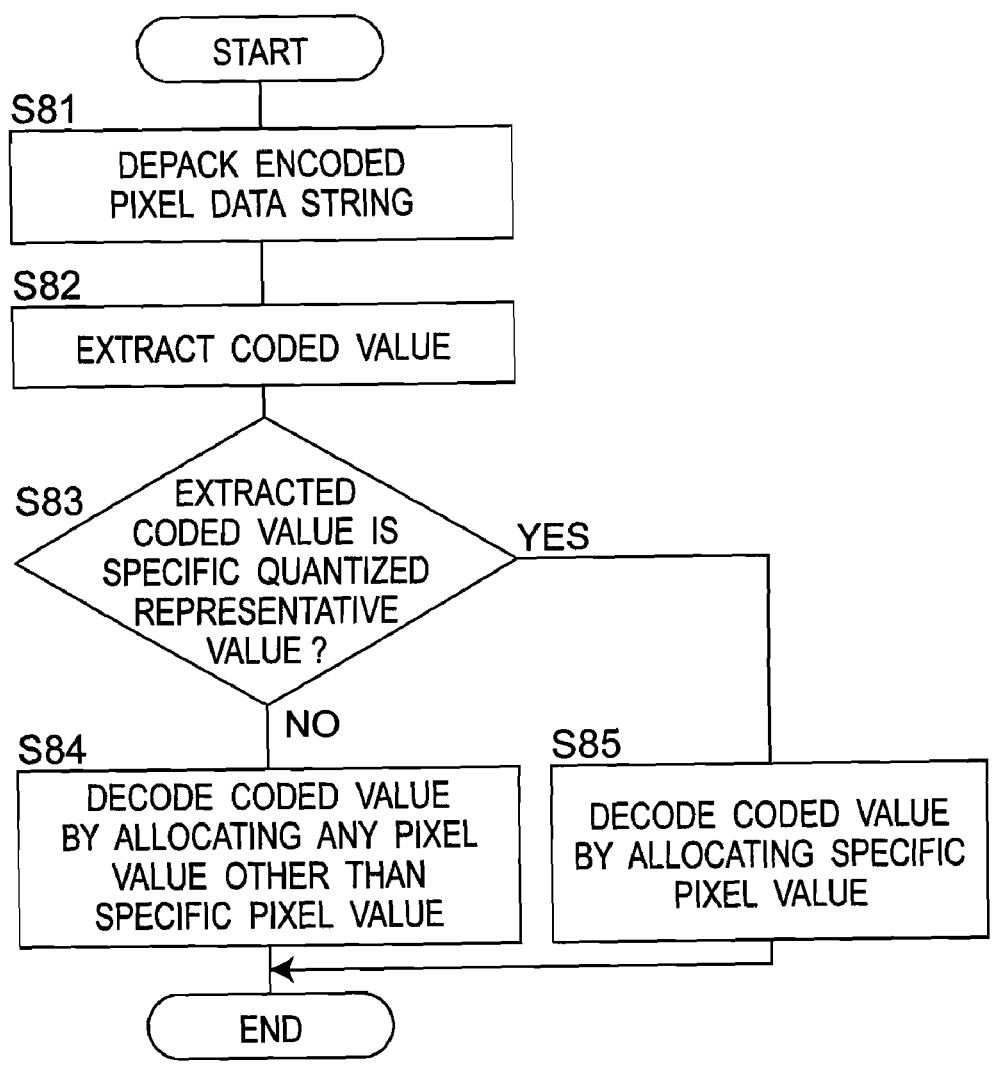
FIG. 25 is a flowchart of an image decoding method according to the eighth embodiment of the present invention.

FIG. 24 is a flowchart of an image decoding method according to the eighth embodiment of the present invention.

(a) An encoded pixel data string is depacked (S81).

(b) A coded value is extracted (S82). For example, an encoded quantized representative value of a pixel value is extracted.

(c) It is determined whether the extracted quantized representative value is a specific quantized representative value (S83). If the quantized representative value is the specific quantized representative value, it means that its original pixel value is defective pixel data and thus decoding is performed by allocating a specific pixel value (S85).

(d) On the other hand, if the value is not the specific quantized representative value, then the quantized representative value is decoded by allocating a pixel value other than the specific pixel value (S84).

By the above-described manner, from a pixel data string containing an encoded quantized representative value of at least one pixel value, a pixel data string containing a decoded pixel value can be obtained.

Ninth Embodiment

Figure 26:
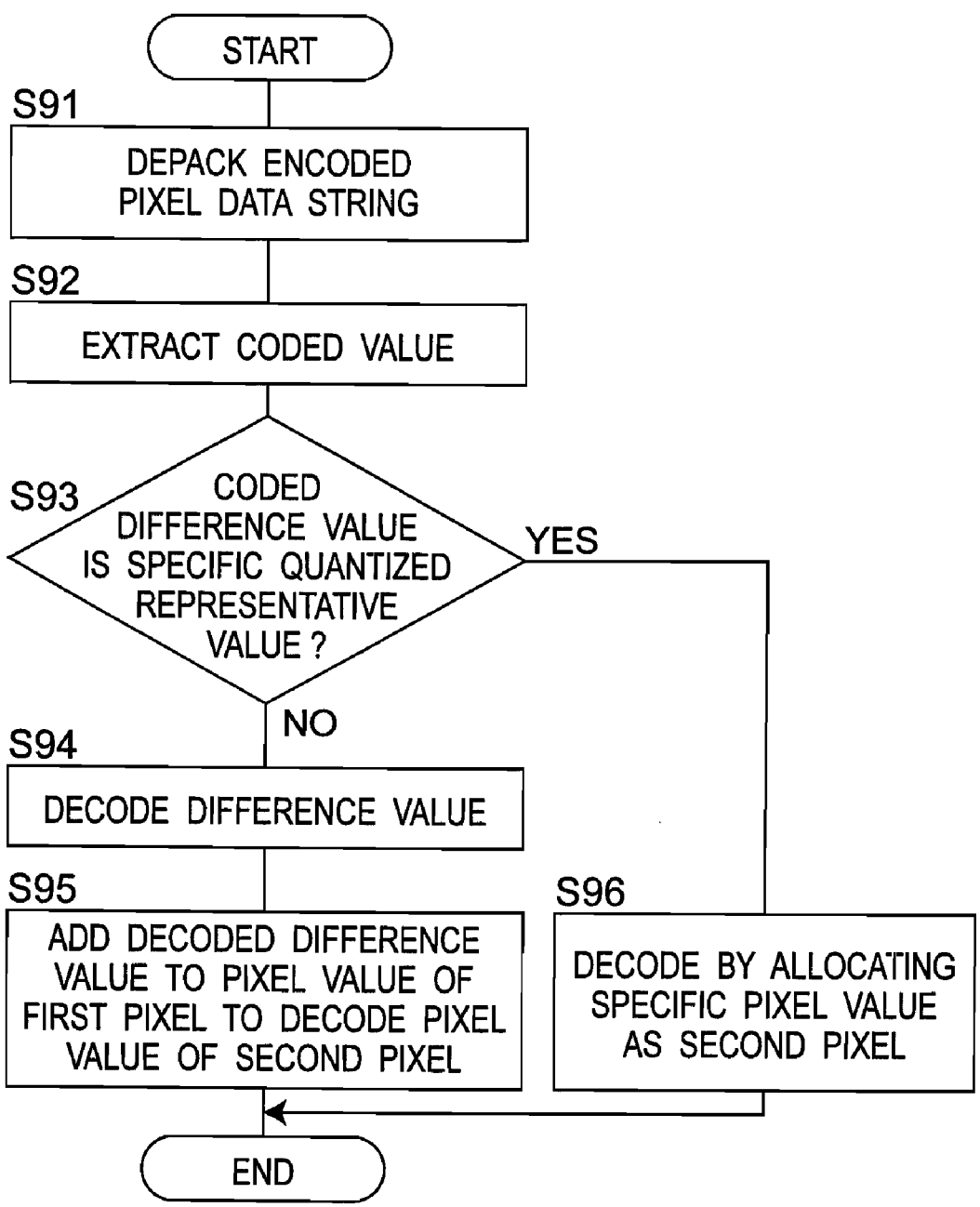
FIG. 26 is a flowchart of an image decoding method according to a ninth embodiment of the present invention.

FIG. 26 is a flowchart of an image decoding method according to a ninth embodiment of the present invention.

(a) An encoded pixel data string is depacked (S91).

Figure 22A:
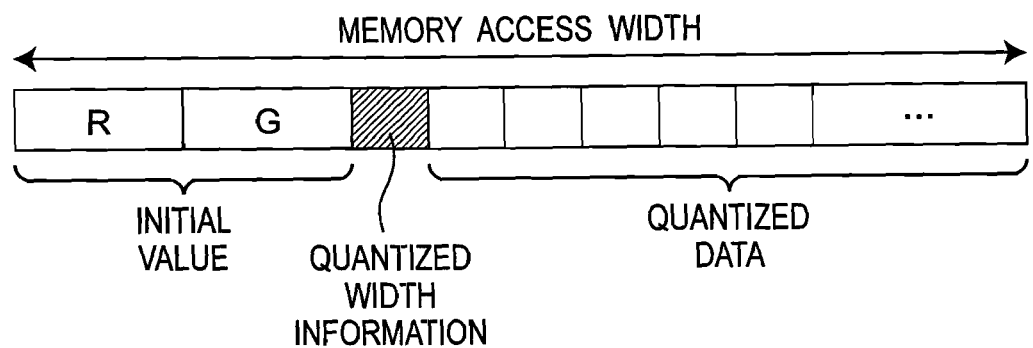
FIG. 22A is a schematic diagram showing an example in which data on two colors of R (red) and G (green) is stored and packed in a predetermined unit.
Figure 22B:
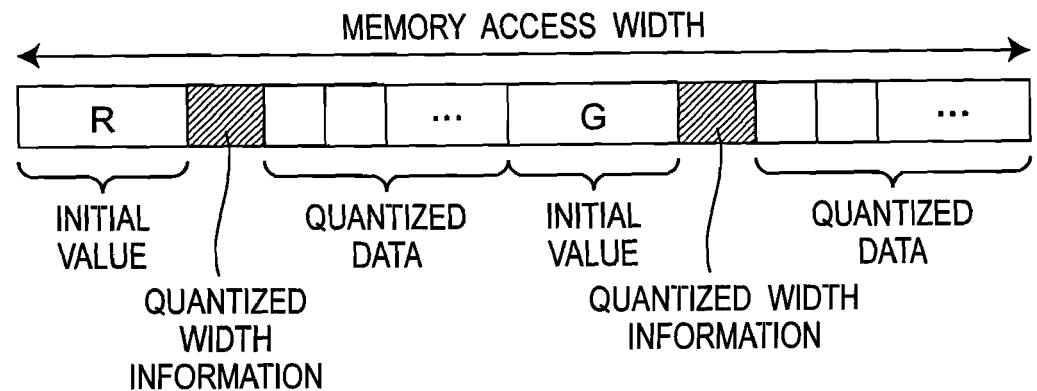
FIG. 22B is a schematic diagram showing an example in which data is stored so as to be separately arranged between colors of R (red) and G (green), and packed in a predetermined unit.

(b) A coded value is extracted (S92). For example, a pixel value of a first pixel is extracted, and also an encoded quantized representative value of a difference value δ between the pixel value of the first pixel and a pixel value of a second pixel near the first pixel is extracted. In the example of FIG. 22A or 22B, as an initial value, a pixel value (m bits) of a first pixel can be extracted directly. The aforementioned difference value δ can be extracted as encoded quantized data (n bits).

(c) It is determined whether an encoded difference value is a specific quantized representative value (S93). If the difference value is the specific quantized representative value, then decoding is performed by allocating a specific pixel value as a pixel value of a second pixel (S96).

(d) An n-bit difference value δ is decoded into m bits (S94). In this case, since the difference value δ can be represented within an n-bit range of 0 to $2^n-1$, for higher-order bits that exceed n bits and are up to m bits, 0 is arranged and a conversion from the n bits to the m bits can be performed.

(e) The decoded m-bit difference value is added to an m-bit pixel value of a first pixel to decode an m-bit pixel value of the second pixel (S95).

By the above-described manner, from a pixel data string containing an n-bit quantized representative value into which a difference value between pixels is encoded, a pixel data string containing a decoded m-bit pixel value can be obtained.

Note that although the above example describes the case in which a pixel value of a first pixel can be extracted directly as an initial value, as shown in FIG. 22, the present invention is not limited thereto. For example, a pixel value of a pixel that is calculated by the addition of a difference value relative to an initial value can be considered as a pixel value of a first pixel relative to a pixel value of a subsequent consecutive pixel. For two pixels that are consecutive as well and located near each other, a pixel value obtained by decoding which is performed just previously may be used as a pixel value of a first pixel to obtain a pixel value of a second pixel.

Tenth Embodiment

FIG. 24 is a block diagram showing the configuration of an image decoding device 20a according to a tenth embodiment of the present invention. This image decoding device 20a is different from the image decoding device according to the eighth embodiment in that the image decoding device 20a includes a quantized width extracting unit 35 that shows a degree of compression of an encoded difference value. The image decoding device 20a includes the quantized width extracting unit 35 and thus can decode a difference value that has been compressed and encoded, based on a quantized width.

Figure 27:
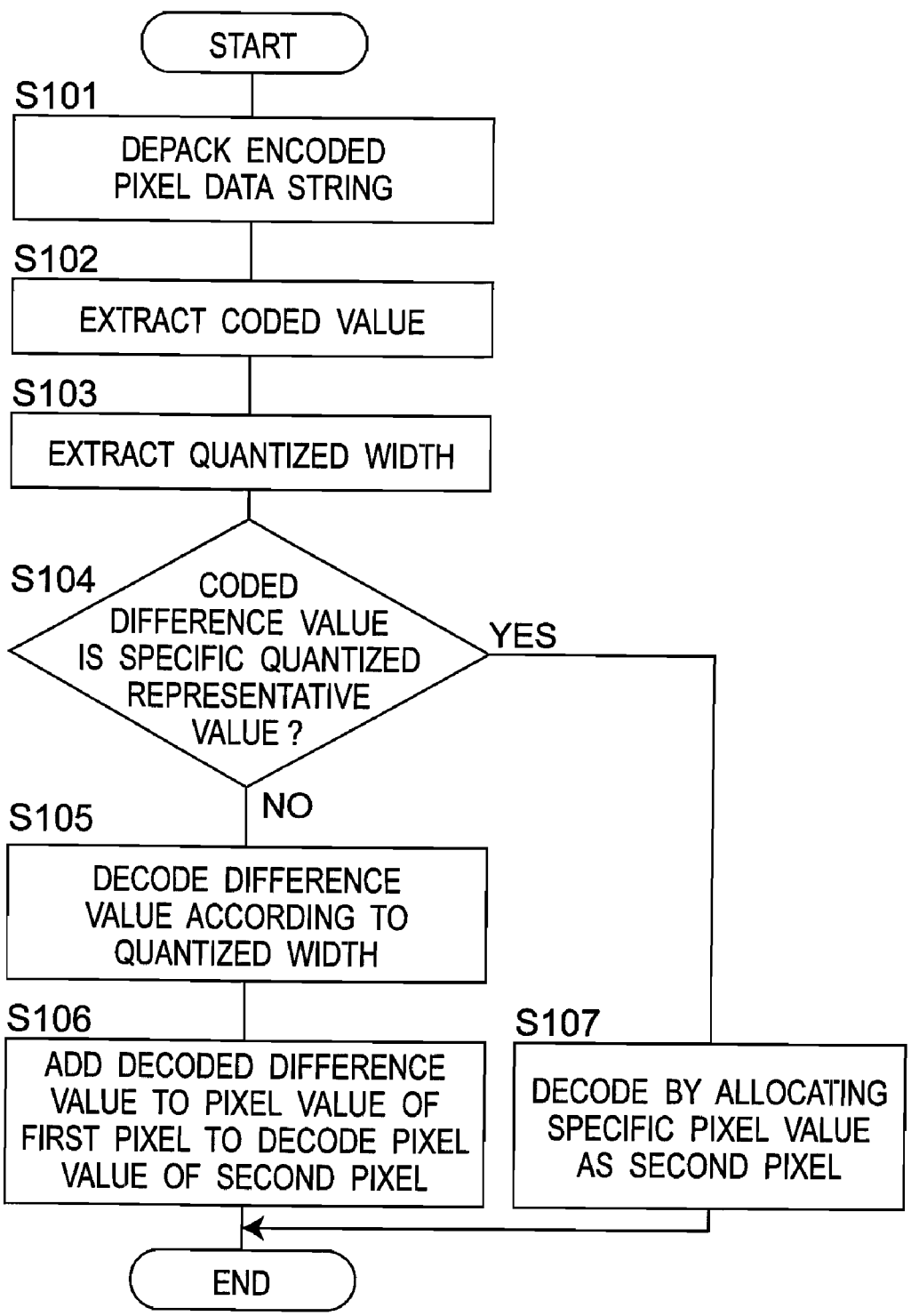
FIG. 27 is a flowchart of an image decoding method according to a tenth embodiment of the present invention.

FIG. 27 is a flowchart of an image decoding method according to the tenth embodiment of the present invention.

(a) An encoded pixel data string is depacked (S101).

(b) A coded value is extracted (S102).

(c) A quantized width representing a degree of compression of an encoded difference value is extracted (S103).

(d) It is determined whether the encoded difference value is a specific quantized representative value (S104). If the encoded difference value is the specific quantized representative value, it means that a pixel value of a second pixel is defective pixel data, and thus, decoding is performed by allocating a specific pixel value as the pixel value of the second pixel (S107).

(e) On the other hand, if the encoded difference value is not the specific quantized representative value, then the difference value is decoded according to the quantized width (S105).

(f) The decoded difference value is added to a pixel value of a first pixel to decode the pixel value of the second pixel (S106).

By the above-described manner, from a pixel data string containing an n-bit quantized representative value into which a difference value between pixels is encoded, a pixel data string containing a decoded m-bit pixel value can be obtained.

Eleventh Embodiment

Figure 28:
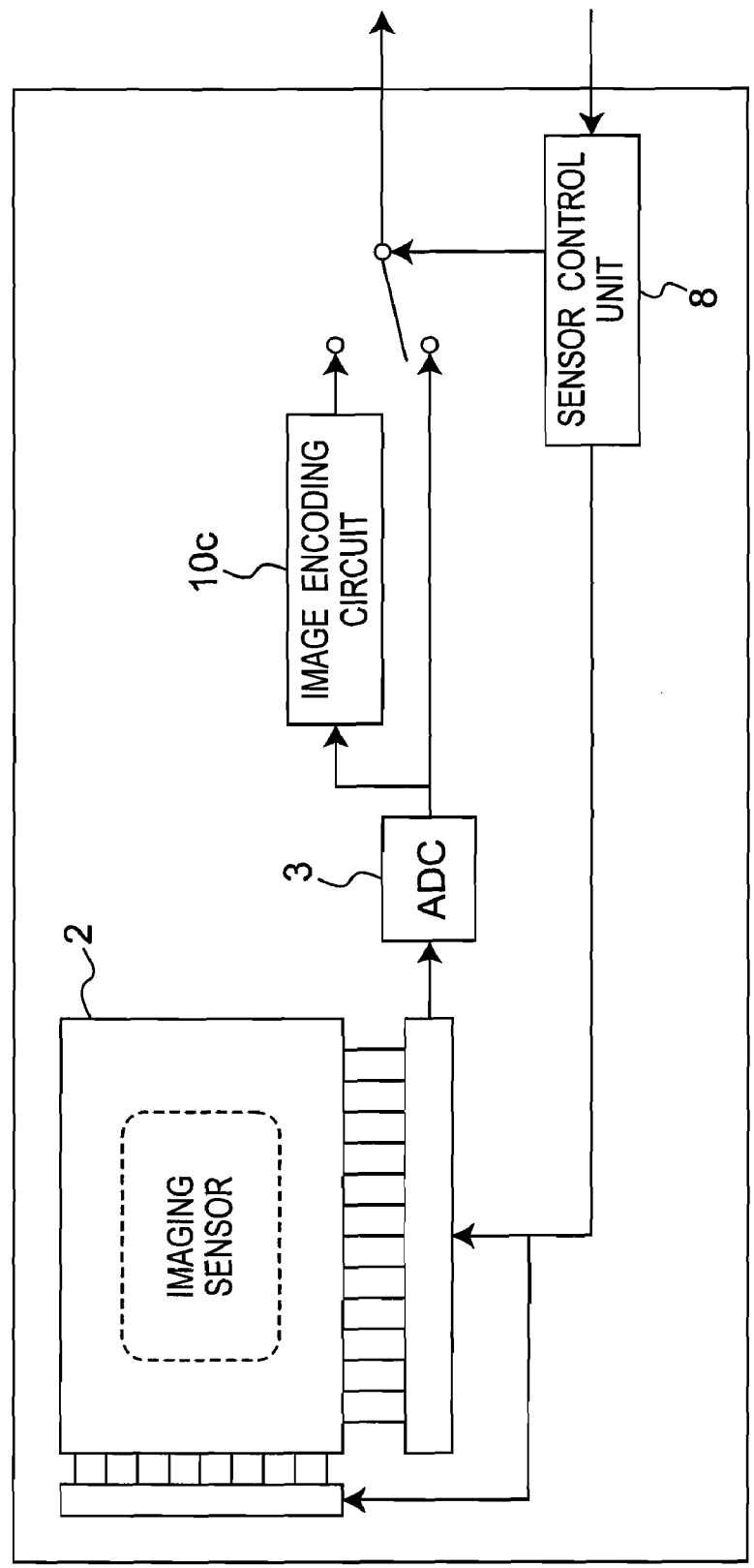
FIG. 28 is a block diagram showing the configuration of an imaging device according to an eleventh embodiment of the present invention.

FIG. 28 is a block diagram showing the configuration of an imaging device according to an eleventh embodiment of the present invention. The imaging device includes an imaging sensor 2, an ADC 3, an image encoding circuit 10c, and a sensor control unit 8. As the image encoding circuit 10c, any of the above-described image encoding devices can also be used. In the imaging device, as the imaging sensor 2, a sensor such as a CMOS sensor that can arrange logic on the periphery thereof is used. In addition, the image encoding circuit 10c is arranged at an analog-digital converted output portion of the ADC 3. Conventionally, data traffic from an imaging device that includes an imaging sensor to the signal processing side has been a big problem. Meanwhile, this imaging device includes the image encoding circuit (compressing unit) 10c and thus as the signal processing side to be connected thereto, one that includes a decompressing (decoding) unit should be just used. Hence, traffic between the imaging device and the signal processing side can be suppressed and accordingly power consumption can be suppressed and also high-speed data transfer to the signal processing side is enabled. In addition, since the image encoding circuit 10c is included, when, as described above, a pixel value is a specific pixel value, the pixel value can be encoded into a specific quantized representative value. Accordingly, when, upon decoding, the specific quantized representative value is detected, it means that a pixel value is the specific pixel value, and thus, reversible encoding/decoding can be performed on the specific pixel value.

The invention claimed is:

1. An image encoding method, which is performed using a processor, for encoding, from a pixel value of a pixel quantized in m-bit accuracy and which is included in a pixel array where a plurality of pixels are arrayed, a pixel value quantized in n-bit accuracy, where n-bit is smaller than m-bit, the image encoding method comprising:

determining whether a pixel value of a pixel to be encoded is a specific pixel value;

when the pixel value of the pixel to be encoded is the specific pixel value,
encoding the pixel value of the pixel to be encoded by allocating a specific quantized representative value included in a range of quantized representative values to the pixel to be encoded, the range of the quantized representative values including a quantized representative value which is quantized in n-bit accuracy from the pixel value of the pixel to be encoded; and
when the pixel value of the pixel to be encoded is other than the specific pixel value,
adding a predetermined offset value to the pixel value of the pixel to be encoded, and
encoding the pixel value of the pixel to be encoded by allocating a quantized representative value other than the specific quantized representative value to the pixel value to be encoded, the range of the quantized representative values including the quantized representative value other than the specific quantized representative value.

2. The image encoding method according to claim 1, wherein the predetermined offset value is $2^{(m-n)}-1$.

3. An image encoding method, which is performed using a processor, for encoding, from a pixel value of a pixel quantized in m-bit accuracy and which is included in a pixel array where a plurality of pixels are arrayed, a pixel value quantized in n-bit accuracy, where n-bit is smaller than m-bit, the image encoding method comprising:
calculating a difference value between a pixel value of a pixel to be encoded and a pixel value of a pixel adjacent to the pixel to be encoded;
setting a quantized width used at the time of quantizing in n-bit accuracy according to the size of the difference value and a quantized representative value which is quantized in n-bit accuracy from the difference value;
determining whether the pixel value of the pixel adjacent to the pixel to be encoded is a specific pixel value;
when the pixel value of the pixel adjacent to the pixel to be encoded is not the specific pixel value, quantizing the difference value in n-bit accuracy by using the quantized width; and
when the pixel value of the pixel adjacent to the pixel to be encoded is the specific pixel value, quantizing the difference value by allocating a specific quantized representative value included in a range of quantized representative values to the difference value, the range of the quantized representative values including the quantized representative value quantized in n-bit accuracy from the difference value.

4. The image encoding method according to claim 3, wherein when the pixel value of the pixel adjacent to the pixel to be encoded is not the specific pixel value, the quantizing the difference value by allocating the specific quantized representative value included in the range of the quantized representative values to the difference value includes:
changing the quantized width to a quantized width larger than the quantized width; and
quantizing the difference value in n-bit accuracy by using the changed quantized width.

5. The image encoding method according to claim 3, wherein when the pixel value of the pixel adjacent to the pixel to be encoded is not the specific pixel value, the quantizing the difference value by allocating the specific quantized representative value included in the range of the quantized representative values to the difference value includes:
quantizing the difference value in n-bit accuracy by allocating a quantized representative value other than the specific quantized representative value included in the range of the quantized representative values.

6. The image encoding method according to claim 3, further comprising
selecting a pixel having a pixel value other than the specific value as the pixel to be encoded.

7. The image encoding method according to claim 3,
wherein the pixel array has pixels of at least two types of colors arrayed therein, and
wherein the pixel adjacent to the pixel to be encoded has the same color as the pixel to be encoded.

8. The image encoding method according to claim 3,
wherein the pixel array has pixels of at least two types of colors arrayed therein, and
wherein the pixel adjacent to the pixel to be encoded has a different color other than the color of the pixel to be encoded.

9. The image encoding method according to claim 1, further comprising
packing the pixel array including the plurality of pixels, each pixel having a quantized representative value quantized in n-bit accuracy, by multiples of a memory access bit width.

10. An image encoding device for encoding, from a pixel value of a pixel quantized in m-bit accuracy and which is included in a pixel array where a plurality of pixels are arrayed, a pixel value quantized in n-bit accuracy, where n-bit is smaller than m-bit, the image encoding device comprising:
a specific pixel value determining unit that determines whether a pixel value of a pixel to be encoded is a specific pixel value;
an encoding unit that (i) when the pixel value of the pixel to be encoded is the specific pixel value, performs encoding of the pixel value of the pixel to be encoded by allocating a specific quantized representative value included in a range of quantized representative values to the pixel to be encoded, the range of the quantized representative values including a quantized representative value which is quantized in n-bit accuracy from the pixel value of the pixel to be encoded, and (ii) when the pixel value of the pixel to be encoded is other than the specific pixel value, performs encoding of the pixel value of the pixel to be encoded by allocating a quantized representative value other than the specific quantized representative value, the range of the quantized representative values including the quantized representative value other than the specific quantized representative value; and
an adding unit that adds, when the pixel value of the pixel to be encoded is other than the specific pixel value, a predetermined offset value to the pixel value of the pixel to be encoded prior to encoding the pixel value of the pixel to be encoded.

11. An image encoding device for encoding, from a pixel value of a pixel quantized in m-bit accuracy and which is included in a pixel array where a plurality of pixels are arrayed, a pixel value quantized in n-bit accuracy, where n-bit is smaller than m-bit, the image encoding device comprising:
a difference value calculating unit that calculates a difference value between a pixel value of a pixel to be encoded and a pixel value of a pixel adjacent to the pixel to be encoded;
a setting unit that sets a quantized width used at the time of quantizing in n-bit accuracy according to the size of the difference value and a quantized representative value which is quantized in n-bit accuracy from the difference value;

a specific pixel value determining unit that determines whether the pixel value of the pixel adjacent to the pixel to be encoded is a specific pixel value; and an encoding unit that (i) when the pixel value of the pixel adjacent the pixel to be encoded is the specific pixel value, quantizes the difference value in n-bit accuracy by using the quantized width, and (ii) when the pixel value of the pixel adjacent to the pixel to be encoded is other than the specific pixel value, quantizes the difference value by allocating a specific quantized representative value included in a range of quantized representative values to the difference value, the range of the quantized representative values including the quantized representative value quantized in n-bit accuracy from the difference value.

* * * * *